US011401042B2

(12) United States Patent
Peleg

(10) Patent No.: US 11,401,042 B2
(45) Date of Patent: Aug. 2, 2022

(54) VERTICAL TAKE-OFF AND LANDING AIRCRAFT AND TRANSFORMATION GEAR SETS FOR SAME

(71) Applicant: FLYWORKS LTD, Kibbutz Hulda (IL)

(72) Inventor: Gad Peleg, Kibbutz Hulda (IL)

(73) Assignee: FLYWORKS LTD., Kibbutz Hulda (IL)

( * ) Notice: Subject to any disclaimer, the term of this patent is extended or adjusted under 35 U.S.C. 154(b) by 343 days.

(21) Appl. No.: 16/753,791

(22) PCT Filed: Oct. 21, 2018

(86) PCT No.: PCT/IB2018/058181
§ 371 (c)(1),
(2) Date: Apr. 5, 2020

(87) PCT Pub. No.: WO2019/082043
PCT Pub. Date: May 2, 2019

(65) Prior Publication Data
US 2020/0262574 A1    Aug. 20, 2020

Related U.S. Application Data

(60) Provisional application No. 62/575,536, filed on Oct. 23, 2017.

(51) Int. Cl.
*B64D 35/08* (2006.01)
*B60L 50/60* (2019.01)
(Continued)

(52) U.S. Cl.
CPC .............. *B64D 35/08* (2013.01); *B60L 50/60* (2019.02); *B64C 39/024* (2013.01); *B64D 27/02* (2013.01);
(Continued)

(58) Field of Classification Search
CPC ........ B64D 35/08; B64D 41/00; B64D 27/02; B60L 50/15; B64C 39/024
See application file for complete search history.

(56) References Cited

U.S. PATENT DOCUMENTS

| 5,343,970 | A | 9/1994 | Severinsky |
| 6,293,491 | B1* | 9/2001 | Wobben ................. B64D 27/24 244/17.23 |

(Continued)

FOREIGN PATENT DOCUMENTS

| CN | 204223175 U | 3/2015 |
| CN | 105314105 | 7/2017 |

(Continued)

OTHER PUBLICATIONS

Blain, "Yeair! hybrid gasoline/electric quadcopter boasts impressive numbers," New Atlas, May 27, 2015, https://newatlas.com/yeair-hybrid-two-stroke-combustion-quadcopter-drone/37713/, visited Apr. 5, 2020.

(Continued)

*Primary Examiner* — Michael H Wang
(74) *Attorney, Agent, or Firm* — The Law Office of Joseph L. Felber

(57) ABSTRACT

A vertical take-off and landing aerial vehicle (VTOL) includes a plurality of rotors for producing lift. For each respective rotor the VTOL has an auxiliary power source (APS) and a transformation gear set (TGS) both being associated with the respective rotor, and the VTOL further includes at least one main power source (MPS). Each TGS is configured to form an outgoing power towards its respective rotor from input powers received into the TGS from the MPS and from the APS associated with the respective rotor.

30 Claims, 20 Drawing Sheets

(51) Int. Cl.
  *B64C 39/02* (2006.01)
  *B64D 27/02* (2006.01)
  *B64D 41/00* (2006.01)

(52) U.S. Cl.
  CPC .......... *B64D 41/00* (2013.01); *B60L 2200/10* (2013.01); *B64C 2201/027* (2013.01); *B64C 2201/042* (2013.01); *B64C 2201/044* (2013.01); *B64C 2201/108* (2013.01); *B64D 2027/026* (2013.01)

(56) References Cited

U.S. PATENT DOCUMENTS

| | | | |
|---|---|---|---|
| 8,016,226 | B1 | 9/2011 | Wood |
| 8,636,241 | B2 * | 1/2014 | Lugg .................. B64D 27/24 244/12.3 |
| 9,102,326 | B2 | 8/2015 | Anderson et al. |
| 9,376,208 | B1 * | 6/2016 | Gentry .................. B64D 27/24 |
| 2003/0052222 | A1 | 3/2003 | Plump et al. |
| 2011/0281679 | A1 * | 11/2011 | Larrabee ................ B64D 27/04 903/910 |
| 2012/0329593 | A1 | 12/2012 | Larrabee et al. |
| 2013/0231208 | A1 * | 9/2013 | Buono .................. B64D 27/24 475/5 |
| 2016/0167799 | A1 * | 6/2016 | Smaoui .................. B60K 6/442 701/16 |
| 2016/0376005 | A1 | 12/2016 | Phan et al. |
| 2017/0029131 | A1 * | 2/2017 | Steinwandel .......... B64D 27/24 |
| 2017/0066531 | A1 | 3/2017 | McAdoo |
| 2017/0253331 | A1 | 9/2017 | Nakashima |
| 2017/0305526 | A1 | 10/2017 | Thomassey |
| 2019/0061924 | A1 | 2/2019 | Kita |

FOREIGN PATENT DOCUMENTS

| | | |
|---|---|---|
| EP | 2 962 885 | 1/2016 |
| EP | 3 564 122 | 11/2019 |
| KR | 101704500 | 2/2017 |
| RU | 2548304 | 4/2015 |
| WO | 2015073084 | 5/2015 |

OTHER PUBLICATIONS

"Hybrix—A hybrid quadcopter," Nov. 20, 2015, http://driftinggyro.blogspot.com/2015/11/hybrix-hybrid-quadcopter.html, visited Apr. 5, 2020.

* cited by examiner

VERTICAL TAKE-OFF AND LANDING AIRCRAFT AND TRANSFORMATION GEAR SETS FOR SAME

TECHNICAL FIELD

Embodiments of the invention relate to a vertical take-off and landing aircraft (VTOL) and to transformation gear sets for a VTOL; in particular a rotorcraft.

BACKGROUND

Vertical take-off and landing aircrafts (VTOL), such as rotorcrafts or multicopters, are relatively simple in their design in relation e.g. to helicopters that rely on sophisticated mechanics to achieve maneuverability. Multicopters may in turn have in some cases a relatively more sophisticated electronic controls to fly, while the lift power is typically distributed through multiple motors that are controlled via a flight controller.

Endurance of a VTOL, such as a multicopter, can be defined by the maximum time that an aircraft can remain airborne with a given payload. Several parameters may affect endurance. One of these parameters may be the energy content. The higher the fraction of the fuel's weight in an aircraft's total take-off weight and the higher this fuel's energy content per mass unit—the longer its endurance;

Dependence solely on electrical energy for producing lift may be disadvantageous due e.g. to limited energy capacity of electrical storage devices e.g. batteries. Therefore, at least some VTOL's rely on sources of energy for lift with higher energy content per mass unit (i.e. 'Specific Energy') such as gasoline. In addition, using e.g. an internal combustion engine and converting its energy to electric energy by using an alternator is disadvantageous due to the low combined efficiency of the engine-alternator-rectifier power supply unit and its high weight.

In multicopters it may be desirable to deliver a controlled amount of thrust at each rotor so stabilization and maneuverability can be achieved. In an electrical multicopter—each rotor may have its own motor and thrust control may be achieved by electrically controlling each motor's power. This is usually done using an Electronic Speed Controller unit or ESC. In e.g. gasoline powered multicopters, delivering different power to each rotor may be more complex.

Hybrid solutions that combine more than one form of onboard energy to achieve propulsion can be found e.g. in cars. A hybrid car typically has a traditional internal-combustion engine, a fuel tank, an alternator and one or more electric motors and a battery pack. Such cars most often burn gasoline and utilize electric components to collect and reuse energy that otherwise may have been wasted.

EP2962885 relates to an electric power system that includes an internal combustion engine and a generating system for an electrical power supply for an aircraft. The power system provides functions that include generating and storing electrical energy.

US2012329593 describes a hybrid transmission system for aeronautical, marine, or two-wheeled land vehicles that can include use of a planetary or epicyclic gearing system for allowing power coupling between at least two sources of power and the drive train or propulsion drive shaft of a propulsion system.

SUMMARY

The following embodiments and aspects thereof are described and illustrated in conjunction with systems, tools and methods which are meant to be exemplary and illustrative, not limiting in scope.

In an aspect of the invention there is provided a propulsion system for a vertical take-off and landing aerial vehicle (VTOL) embodiment. In one example the VTOL may include at least 3 rotors.

In an embodiment, the propulsion system may include first and second types of power sources—with the first possibly acting as a main power source (MPS) and the second possibly as an auxiliary power source (APS). In at least certain embodiments, the MPS provides the majority of energy of the VTOL in relation to the APS, however in some cases the majority of power may be provided by the APS. In at least certain embodiments, a maximal lift power of a VTOL may be configured to be provided when powers/RPM's of the at least one MPS and APS's are combined at least momentarily for a defined period of time. This manner of provision of maximal lift power may be beneficial in reducing an MPS's engine size and/or weight as opposed to a VTOL embodiment where such maximal lift is designed to be provided by the MPS alone.

In at least certain embodiments, the propulsion system may make use of an MPS incorporating at least one power source type and distributing its power, possibly mechanically, to input sides of at least a few, e.g. at least three or more 'transformation gear sets' (TGS). Possibly, certain embodiments may be configured to include more than one MPS. This may be embodied e.g. by the rotors of a VTOL being divided into groups and each group possibly being configured to receive power from a different MPS.

In at least certain embodiments, distribution/communication of power from an MPS inwards to or towards a TGS and/or outwards or away from a TGS e.g. for further utilization; may be by means of at least one or more of possible: gear(s), belt drive(s), chain drive(s), drive—shaft (s), hydraulic fluid(s).

In an embodiment, a TGS may be any gearbox that can be used as a transformation gearbox; e.g. can receive power input from a few, e.g. two, sources preferably simultaneously and output them into a single combined power output. The received RPM (Revolutions Per Minute) inputs may be transformed in various manners, e.g. may be generally added one to the other, generally subtracted one from the other, or any other desirable function. In a non-binding example, such TGS may be a planetary gearbox, a differential gearbox (or the like). It is noted that rotational speed is referred to herein throughout the present disclosure by the measure RPM.

In at least certain embodiments, a TGS of a suggested propulsion system may receive power from a central MPS as one input. The number of TGS's in one example may be the same as the number of rotors of a VTOL aircraft including such propulsion system; where an output, e.g. an output shaft, of at least some of the TGS's may be linked, possible mechanically linked, to an appropriate rotor by at least one or more of possible: gear(s), belt drive(s), chain drive(s), shaft(s), hydraulic fluid(s). In certain embodiments, a TGS may be directly linked to a respective rotor.

In at least some propulsion system configuration embodiments, power from a MPS may be centrally divided by a distribution gear to the TGS's and then distributed outwards to props/rotors. In some examples, power from a MPS may be divided by a distribution gear and then distributed outwards to TGS's, which in turn are directly connected/coupled to each respective prop/rotor. An APS may also be coupled to each TGS.

Gear structure options for at least certain TGS embodiments may include: planetary type gears.

Such planetary gears may include single-stage planetary gears; multi-stage gears (where the stages are on same plane or on different planes) or stepped planet gears. A planetary type TGS in one example may permit/facilitate integration between one or more APS's preferably being in the form of electrical motors (EM), and a MPS preferably being in the form of an internal combustion engine(s) (ICE), where the APS may possibly be in certain examples of relatively higher speed (RPM) than the MPS. The integrated power sources may typically be outputted to drive a rotor.

Such planetary gear may be of a type including carrier and sun gears. In some non-binding examples/embodiments, the carrier and sun gears may be connected by concentric shafts exiting the gear structure on the same side where the outer shaft is hollow and is connected to one of the following: a planet carrier, a sun gear. In other examples/embodiments the carrier and sun gears may be connected by concentric shafts exiting the gear structure on opposite sides.

Gear structure options for at least certain TGS embodiments may also include: differential gears, either bevel gear type differential and/or spur type differential.

In at least certain TGS embodiments, two power inputs may be mechanically linked to two subassemblies within the gear and one single output may be mechanically linked to a third subassembly. Such power inputs/output can be connected at any configuration regardless of the types of inputs, outputs and TGS type.

For example, in a single stage planetary gear: the three subassemblies may be a ring gear, sun gear and planet gears carrier. In a bevel gear differential the three subassemblies may be a ring gear and spider carrier and the two oppositely sided driven bevel gear.

Power supply types for MPS and APS may be the following.

The MPS may be internal combustion engine(s) (ICE) such as: piston, wankel rotary engines, jet engine, gas turbine engine, rocket engine. In other examples, the MPS may be a hydraulic engine or an external Combustion Engine (ECE) such as Steam, Stirling.

The APS may be: electric motor (EM), AC (AC brushed or Brushless), DC brushless, DC brushed, Outrunner, Inrunner. Such electrical type APS's may be advantageous in providing short reaction times to desired changes in their RPM as opposed to other type engines, such as ICE engines—and thus an EM APS may be useful in providing short reaction times that are necessary for maneuvering a multicopter.

In certain embodiments, an electric motor may be used as the MPS or APS power inputs and it may be supplied with energy using: a battery, a fuel cell, PV cells, an alternator or any combination of the above. In at least certain embodiments, a fully electrical VTOL may have its electric motor functioning as the VTOL's MPS configured to be of higher power capacity and/or more efficient than the electric motor functioning as the VTOL's APS. In such a fully electric VTOL embodiment, the electrical motors functioning as the APS's may be of a lower power capacity relative to an electrical VTOL of equal weight of the prior art including only electrical motors for each rotor that function for providing all the VTOL's lift (and not as in the present embodiment, where the APS's electrical motors function for providing incremental additional thrust e.g. for performing flight maneuvers).

The APS can be used to accelerate or decelerate the output shaft that is driven by the MPS—depending on the direction of revolution of the APS. For example, a TGS translating rotational movements of incoming APS('s) and MPS to provide outgoing rotational movements in the same rotational directions will result in an increase in the overall outputted RPM. And a TGS translating rotational movements of incoming APS('s) and MPS to provide outgoing rotational movements in the opposing rotational directions will result in a decrease in the overall outputted RPM.

In certain embodiments, an electric motor (EM) functioning as the APS can also be used to start e.g. an ICE of the MPS if used. A brake and/or a clutch can be incorporated into the MPS drive shaft in order to achieve different effects such as: Brake/one-way clutch: so its shaft can be stopped from turning when a propulsion system using same is receiving power from the APSs alone. A clutch may be beneficial in disconnection from driving the TGS while idling.

In certain embodiments, a one-way clutch can be incorporated into an APS drive shaft in order to allow the driving of the propeller in the event of an APS failure.

In certain embodiments, if an ICE is used as the MPS—a one-way clutch can be incorporated into the propellers' drive shaft in order to allow for the starting of the ICE by the APS by turning it in the reversed direction to its normal operation.

An EM can be incorporated into the planetary gear, for example when one of the gear's subassemblies is attached to the EM's rotor while it's stator is attached to the frame, or vice-versa; and/or when one of the gear's subassemblies is attached to the EM stator while another subassembly is attached to the EM's rotor.

In certain embodiments, a pulley/sprocket/gear structure can be incorporated into the planetary gear's ring gear where the inner part is an internal gear forming the ring gear and the outer part is a pulley/sprocket/gear allowing for the connection of: a belt, a timing belt, a chain (or the like) for enabling connection of the ring gear assembly to an external input/output. Possibly the internal gear may be a spur gear or any other type of gears (e.g. helical gear), or the like.

In certain embodiments, an ICE or a group of ICE's may be used as the MPS; and multiple electric engines may be used as auxiliary power sources APS.

In some cases, a central electric motor (EM) may be used to generate power more efficiently by working at an ideal working point and controlling the vehicle with smaller electric motors (EM's) inputs at each rotor.

In certain cases, a first ICE may be used as the MPS and another ICE as the APS—with each one being configured with different high efficiency RPM band or power band.

Advantages of at least certain embodiments of the invention may be defied as: allowing the MPS to function at its most efficient RPM, allowing the use of petrol as fuel to extend range due to its high specific energy, increasing safety by allowing for the vehicle to descend safely in the event of a central engine power failure, allowing for a direct mechanical link between the central power plant and each of the rotors—a highly efficient power transfer. At least certain VTOL embodiments including an MPS and APS for providing lift power, allow provision of e.g. momentary high peak power by the two systems (APS+MPS) acting together—consequently permitting use of a smaller sized MPS. A further advantage may be in an ICE based MPS being able to be turned off at certain times thus allowing more quiet operation.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which:

FIGS. 9A to 9E schematically show various operational modes of operation of some VTOL embodiments, while FIG. 9A shows operational modes representative of substantially a whole VTOL embodiment and FIGS. 9B to 9D of a part possibly one arm of a VTOL embodiment.

Figure 1A:
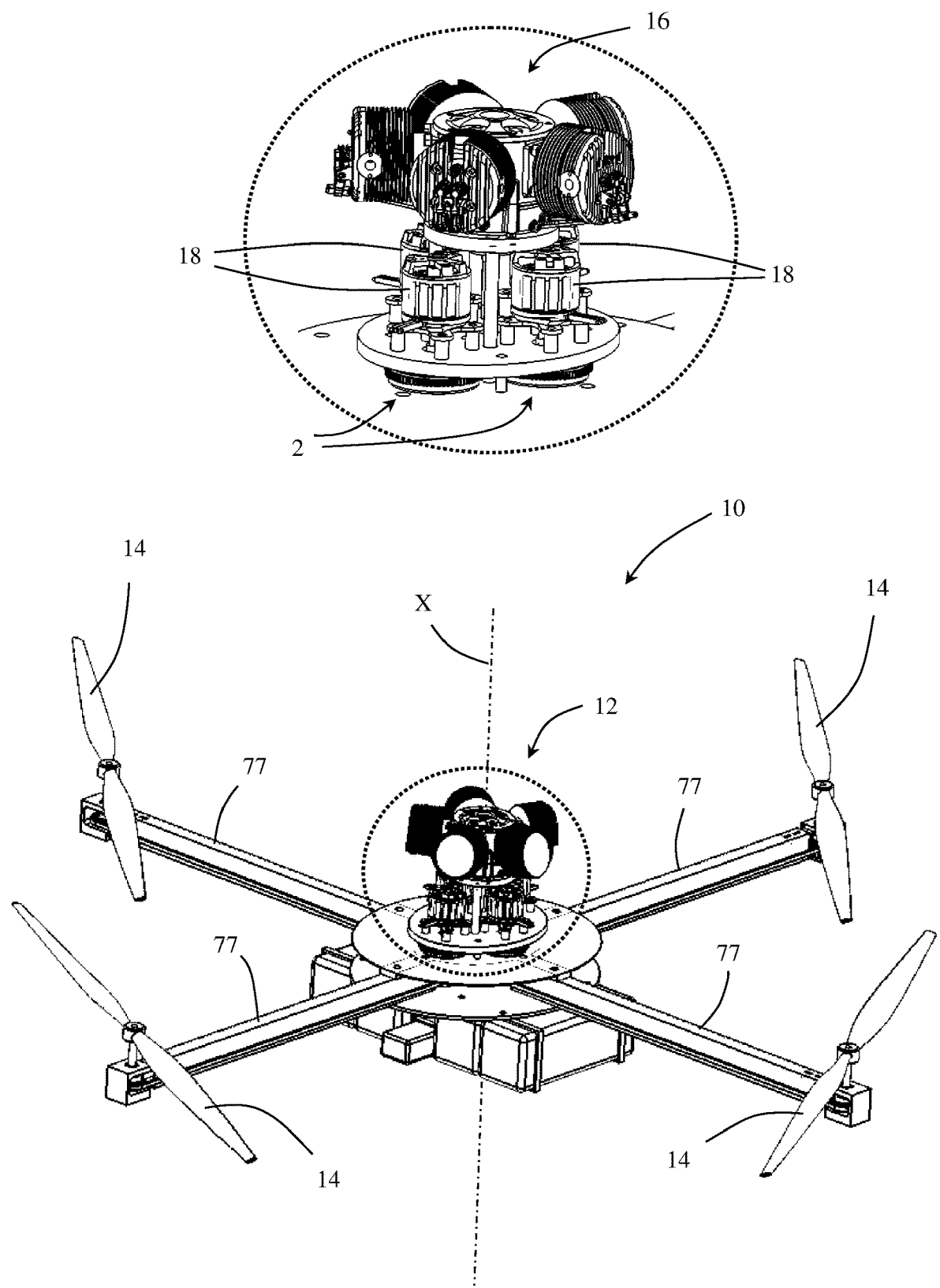
FIGS. 1A and 1B schematically show vertical take-off and landing aircrafts (VTOL) in accordance with certain embodiments of the present invention, respectively in four or three rotor configurations.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Attention is first drawn to FIG. 1A schematically illustrating an embodiment of a vertical take-off and landing aerial vehicle (VTOL) 10. VTOL 10 has a propulsion system 12 that is configured to drive, in this example, rotation in four rotors 14 of the VTOL in order to produce upward lift. Each rotor 14 in this example is arranged at an end portion of an arm 77 of the VTOL. As seen in the enlarged section at the top of the figure, the propulsion system in this example has a main power supply (MPS) 16 and an auxiliary power supply (APS) 18 for each respective rotor 14, thus in this example resulting in four such APS's 18.

The fours rotors 14 in this VTOL example are seen distributed in a substantial symmetric manner about a central axis X of the VTOL that extends in an upward direction. The rotors are here seen being angularly spaced apart one from the other about axis X by about ninety degrees. Possibly, rotors spaced apart by about 180 degrees one from the other are configured to rotate in an identical rotation direction upon receipt of incoming power, while adjacent rotors rotate in counter directions.

Thus, the four rotors here illustrated in at least certain embodiments may be divided into two pairs, where a first one of the pairs (of 180 degree spaced apart rotors) may be configured to rotate in a first rotational direction to produce upward lift and a second one of the pairs (of 180 degree spaced apart rotors) may be configured to rotate in a second rotational direction that is counter to the first direction in order to produce upward lift. Such configuration of rotation in counter directions may facilitate balancing of counter torques formed during operation of the rotors of a VTOL— so that rotation of the body of the VTOL about its central axis X may be more controllable.

MPS 16 in this example may be an internal combustion engine or motor that here optionally includes five cylinders, and each APS may be configured to interact with power arriving from the MPS via a respective 'transformation gear set' (TGS) 2. In the illustrated example of FIG. 1, the MPS and APS's are centrally located at a central region of the VTOL and from there, their powers are distributed outwards to the rotors/props.

Figure 1B:
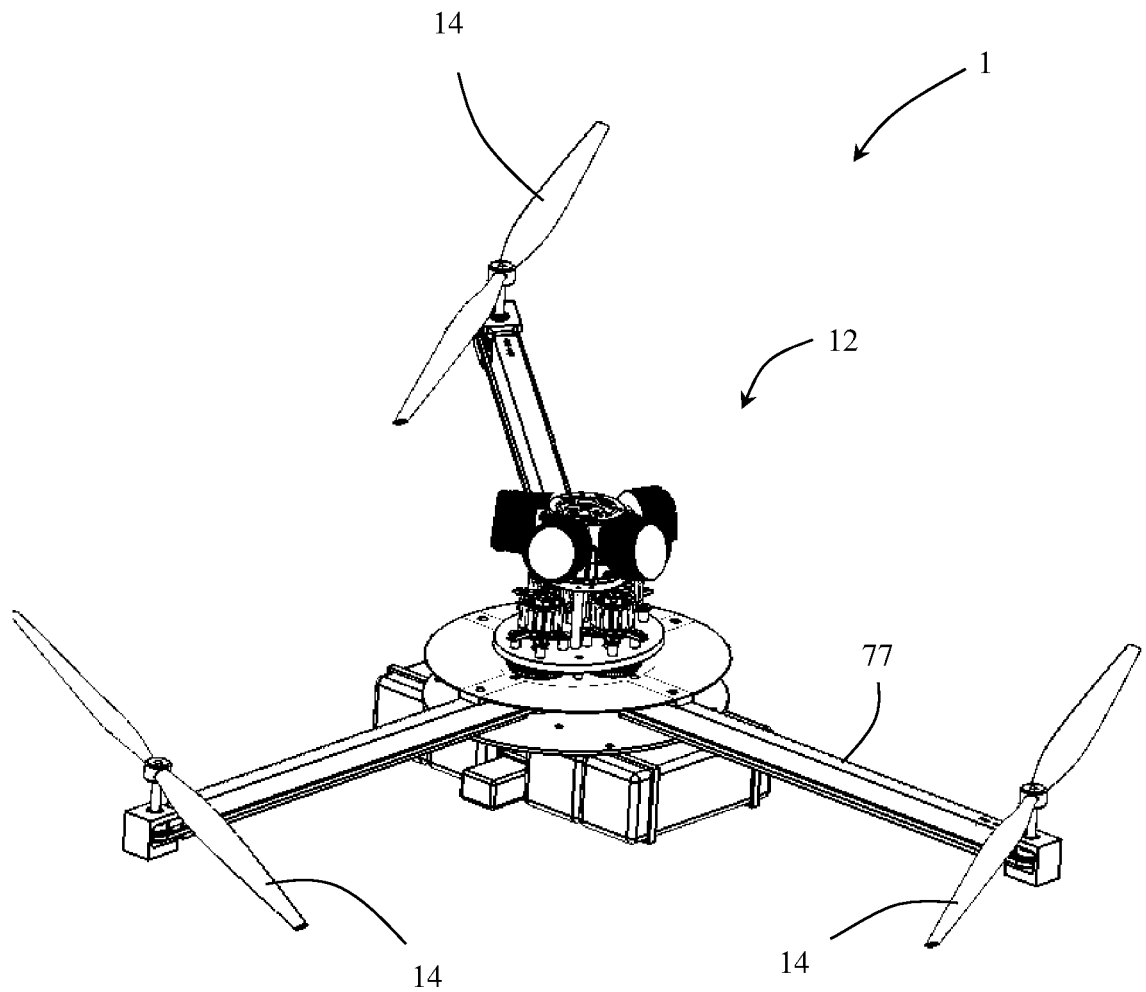

Attention is drawn to FIG. 1B schematically illustrating an embodiment of a vertical take-off and landing (VTOL) aerial vehicle 1. VTOL 1 has a propulsion system 12 that is configured to drive, in this example, rotation in three rotors 14 of the VTOL in order to produce upward lift. Each rotor 14 in this example is arranged at an end portion of an arm 77 of the VTOL. The propulsion system (as in FIG. 1A) has a main power supply (MPS) 16 and an auxiliary power supply (APS) 18 for each respective rotor 14, thus in this example resulting in three such APS's 18.

The tricopter configuration of VTOL 1 with its 3 motors typically is "Y" shaped, where the arms leading toward each rotor are usually 120 degrees apart. Tricopters coming within the scope of the present disclosure may have also other forms such as "T" shape (and the like). Two rotors of VTOL 1 may be configured to spin in opposite directions to counter each other out, while the third (possibly rear) rotor may be configured to be tilted left and right by a servo (not shown) to enable a yaw mechanism.

Attention is now drawn to FIGS. 2A to 2J illustrating various TGS embodiments that me be utilized in a VTOL according to various embodiments of the invention, such as VTOL 10 illustrated in FIG. 1. TGS's of various embodiments may be configured to receive input RPMs (Revolutions Per Minute) from a MPS and an APS and create an amplified or decreased outputted RPM e.g. by subtracting or adding them one to the other according to any desired gain (i.e. ratio between the input RPMs to the output RPM). In other words, the outputted RPM from a TGS may be related in a linear or non-linear manner to the incoming RPMs arriving from the APS and/or MPS.

For example, inputted RPM's P1 and P2 arriving into a TGS may be transformed to an outgoing RPM P3 that may satisfy a ratio of any one of: P1+P2=P3, P1+P2≥P3, P1+P2≤P3 (etc.). Each one of the two RPM inputs of a TGS may be defined in certain cases as having a direct effect of any (linear or non-linear) kind on the RPM output, where this effect may be dependent or independent of the other input.

Figure 2A:
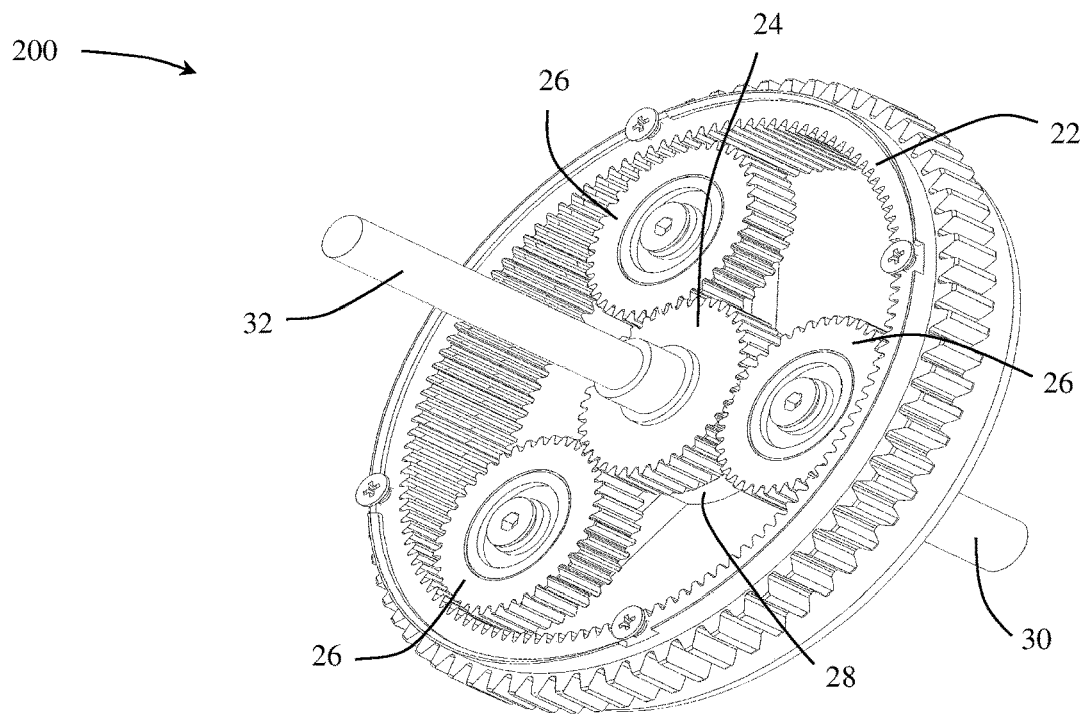
FIG. 2A to 2J schematically show various embodiments of transformation gear sets (TGS) possibly included in at least certain VTOL embodiments.

In FIG. 2A an embodiment of a TGS 200 having a possible planetary type gearbox is illustrated. The planetary type gear of TGS 200 may have a ring 22, a sun 24, three planets 26 and a carrier 28 supporting the planets.

TGS 200 may be configured to transform an incoming RPM arriving from a main power source (such as MPS 16) that may be configured to rotate e.g. ring 22 together with an incoming RPM arriving from an auxiliary power source (such as one of the APS's 18 in FIG. 1) that may be configured to rotate e.g. carrier 28 via a rear shaft 30 of the TGS; in order to produce a transformed outgoing RPM e.g. at a forward shaft 32 of the TGS.

The outgoing rotational power may be coupled to rotate a rotor of a VTOL such as one of the rotors 14 of VTOL 10. Depending on the incoming rotational directions arriving from the MPS (here possibly to ring 22) and from the APS (here possibly to shaft 30); the outgoing RPM of TGS 200 (here possibly at shaft 32) may include a relative increase in RPM (in relation to the RPM of the MPS), a relative decrease in RPM (in relation to the RPM of the MPS), or any partial or full combination of the RPM's or deduction of the RPM's (e.g. an at least partial deduction of the RPM of APS from the RPM of the MPS).

Figure 2B:
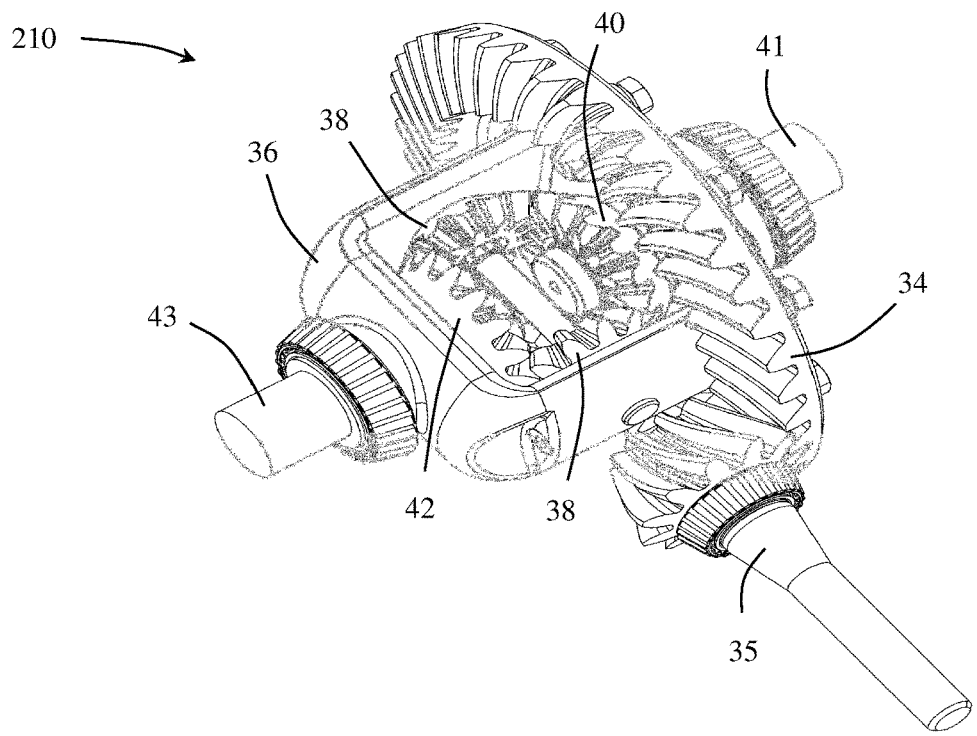

In FIG. 2B an embodiment of a TGS 210 having a possible bevel gear differential type gearbox is illustrated. The differential type gear of TGS 210 may have a drive gear or ring gear 34 configured to be rotated by a drive shaft 35. Drive gear 34 may be mounted on a carrier 36 which supports planetary bevel gears or spider gears 38, which engage right and left driven bevel gears 40, 42 attached each respectively to right and left axles 41, 43.

TGS 210 may be configured to transform an incoming RPM arriving from a main power source (such as MPS 16) that may be configured to rotate e.g. drive shaft 35 together with an incoming RPM arriving from an auxiliary power source (such as one of the APS's 18) that may be configured to rotate e.g. right axle 41; in order to produce a transformed outgoing RPM e.g. at left axle 43 of the TGS.

The outgoing rotational power may be coupled to rotate a rotor of a VTOL such as one of the rotors 14 of VTOL 10. Depending on the incoming rotational directions arriving from the MPS (here possibly to drive shaft 35) and from the APS (here possibly to right axle 41); the outgoing RPM of TGS 210 (here possibly at left axle 43) may include a relative increase in RPM (in relation to the RPM of the MPS), a relative decrease in RPM (in relation to the RPM of the MPS), or any partial or full combination of the RPM's or deduction of the RPM's (e.g. an at least partial deducting of the RPM of APS from the RPM of the MPS). In an embodiment e.g. including a TGS where drive shaft 35 may be absent, the incoming rotational directions arriving from the MPS may directly be configured to rotate ring 34 e.g. by the connection of an external type gear/pulley/sprocket.

Figure 2C:
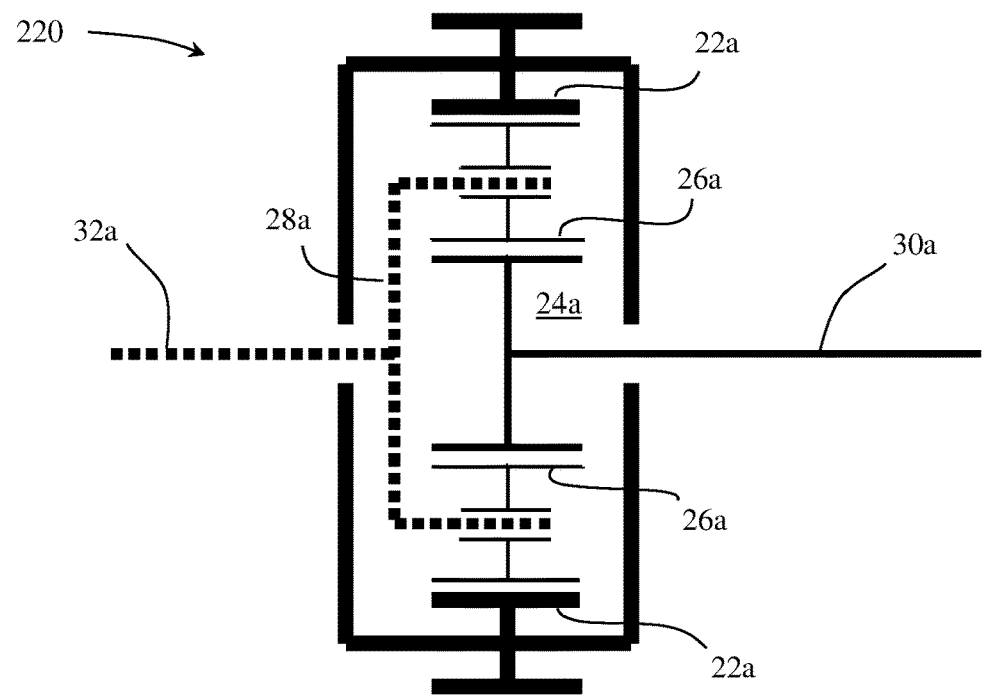

In FIG. 2C an embodiment of a TGS 220 having a possible single-stage planetary gears is illustrated. The single-stage planetary type TGS 220 may have a ring gear 22a, a sun gear 24a, planet gears 26a and a planet carrier 28a supporting the planet gears.

TGS 220 may be configured to transform an incoming RPM arriving from a main power source (such as MPS 16) that may be configured to rotate e.g. ring 22a together with an incoming RPM arriving from an auxiliary power source (such as one of the APS's 18) that may be configured to rotate e.g. sun 24a via a rear shaft 30a of the TGS; in order to produce a transformed outgoing RPM e.g. at a forward shaft 32a of the TGS.

The outgoing rotational power may be coupled to rotate a rotor of a VTOL such as one of the rotors 14 of VTOL 10. Depending on the incoming rotational directions arriving from the MPS (here possibly to ring 22a) and from the APS (here possibly to shaft 30a); the outgoing RPM of TGS 220 (here possibly at shaft 32a) may include a relative increase in RPM (in relation to the RPM of the MPS), a relative decrease in RPM (in relation to the RPM of the MPS), or any partial or full combination of the RPM's or deduction of the RPM's (e.g. an at least partial deducting of the RPM of APS from the RPM of the MPS).

Figure 2D:
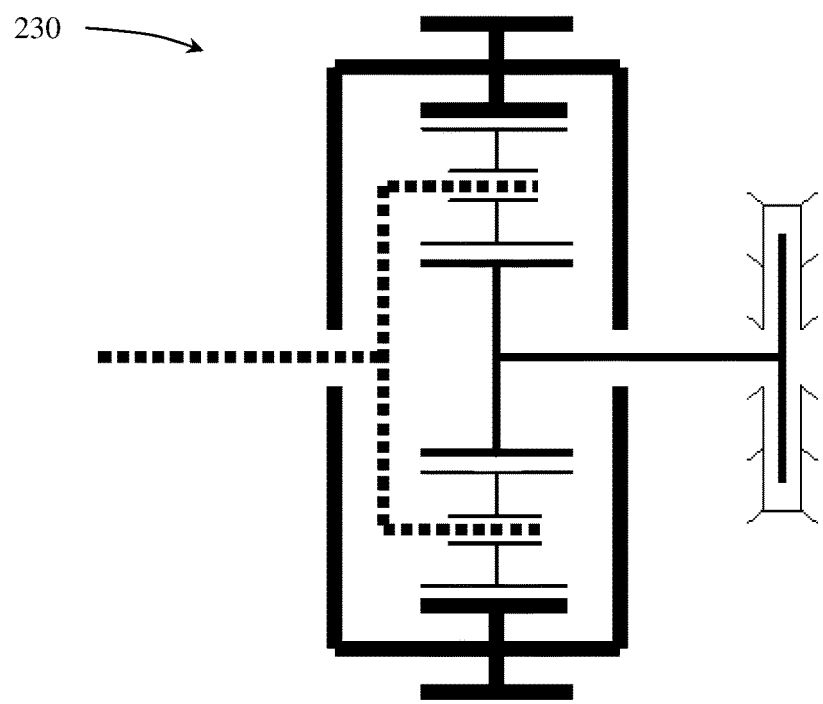
Figure 2E:
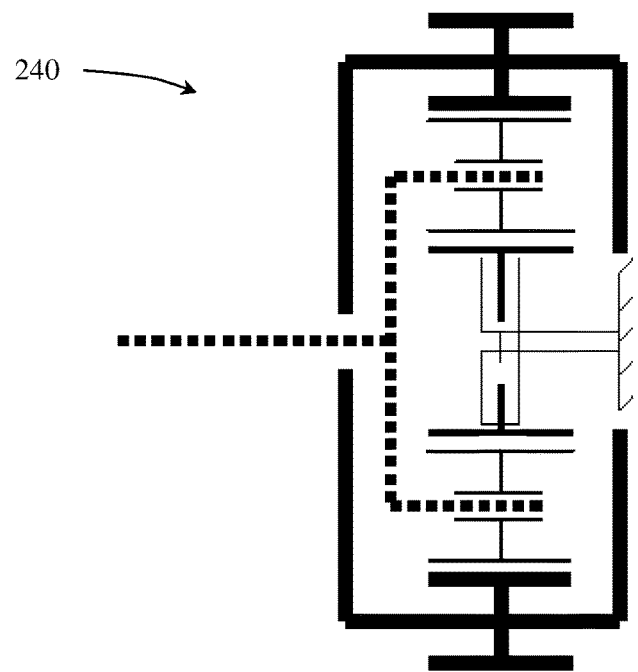
Figure 2F:
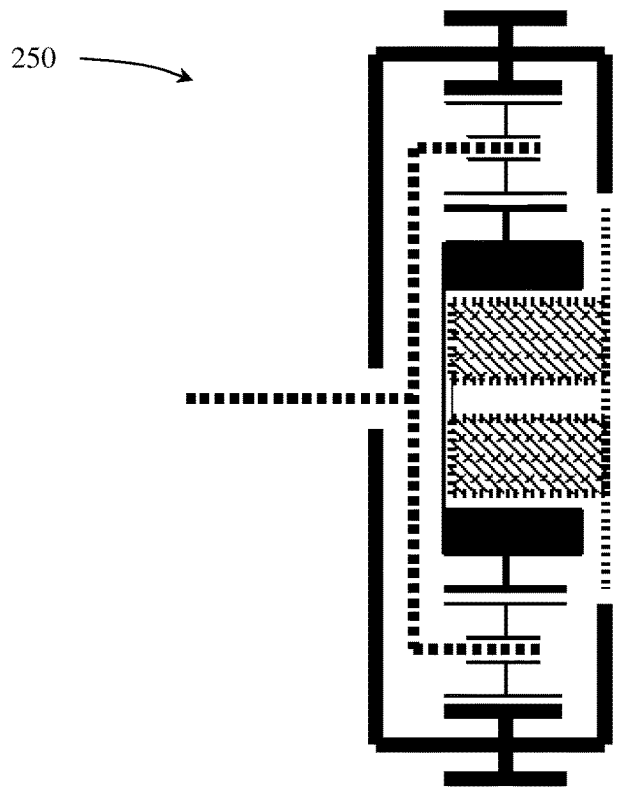
Figure 2G:
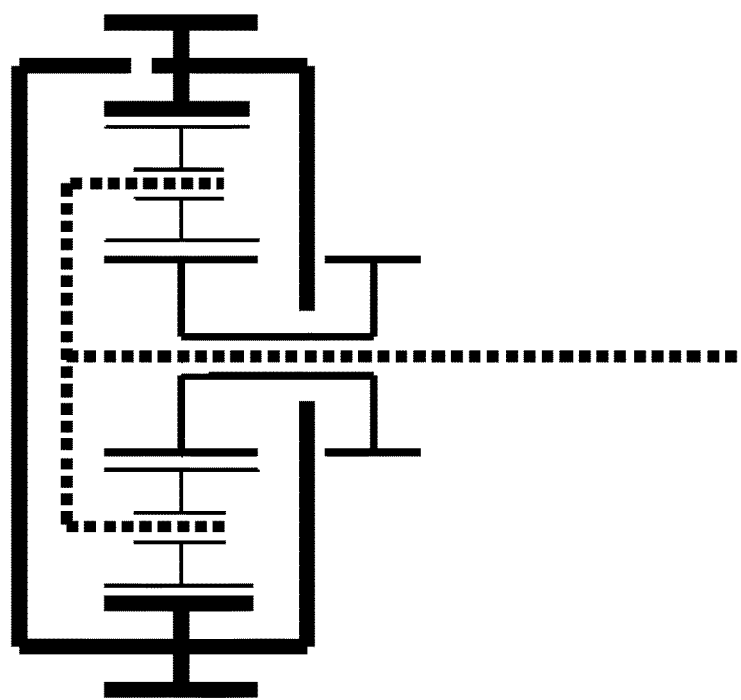
Figure 2H:
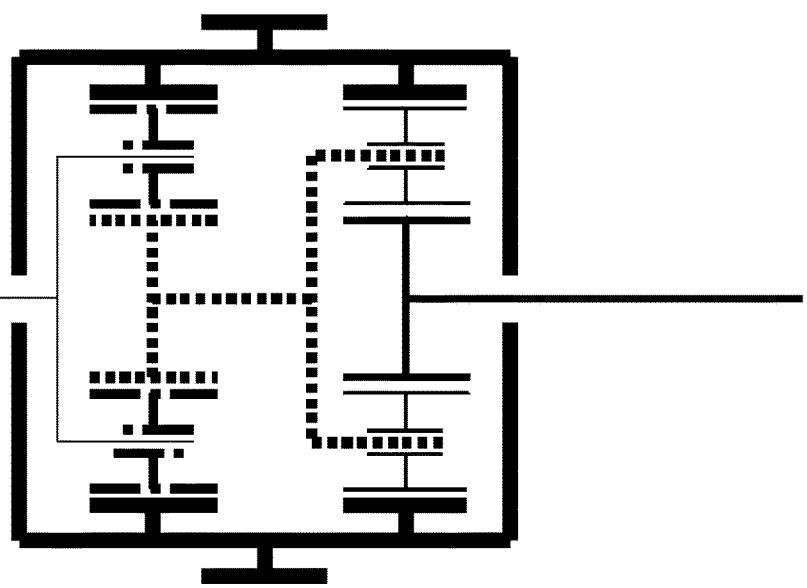
Figure 2I:
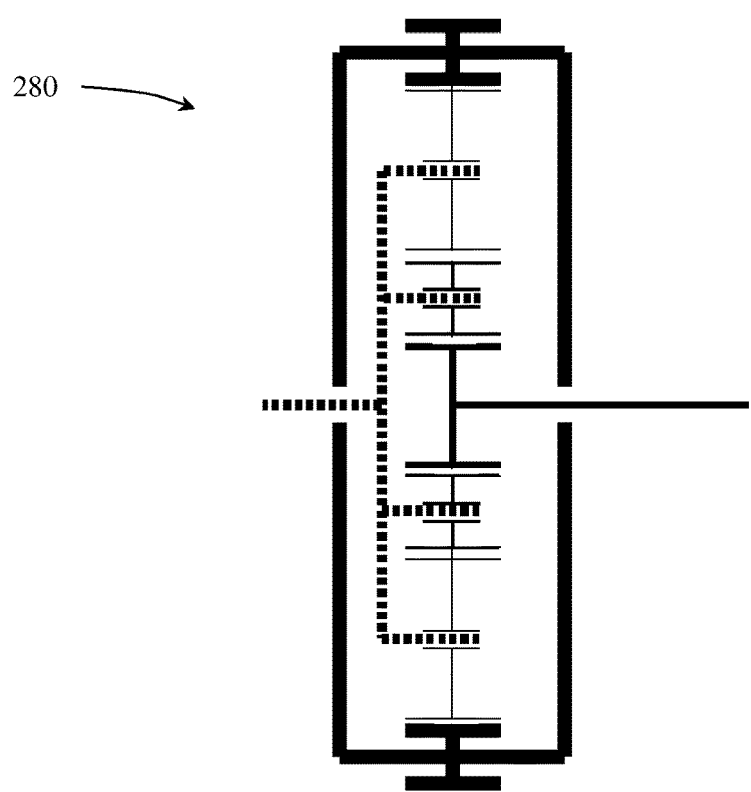
Figure 2J:
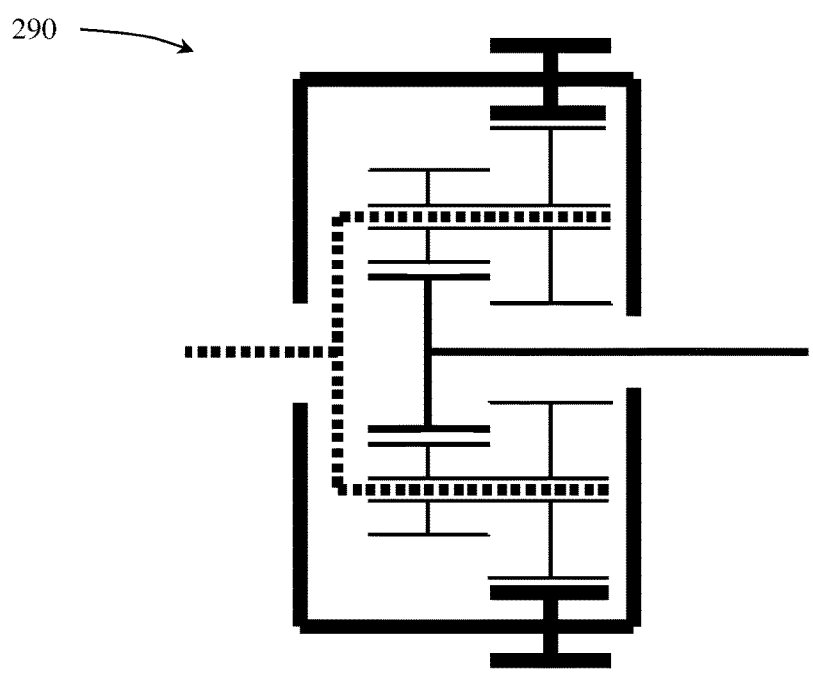

FIGS. 2I, 2H and 2J illustrate additional possible TGS embodiments in similar type block diagram schematics and line types as used in FIG. 2C. The TGS embodiments here illustrated may include a TGS 280 with multi-stage gears on a same plane (FIG. 2I), a TGS 270 with multi-stage gears on different planes (FIG. 2H), or a TGS 290 with multi-stage gears utilizing stepped planet gears (FIG. 2J). With attention drawn to FIG. 2G, an additional example of a possible planetary type TGS embodiment 260 is illustrated, where the carrier and sun gears may be connected by concentric shafts exiting the gear structure on the same side.

In addition, in at least certain TGS embodiments (see, e.g., TGS 250 in FIG. 2F), an EM (that acts as the APS) may be incorporated into the gear structure. In this case the sun gear possibly forms the EM's rotor. In another form of this embodiment—a generator may be incorporated into the TGS where the sun gear possibly forms the generator's rotor. The generator may be used to control the torque on the sun gear and therefore the output shaft's RPM.

In addition, in at least certain embodiments a brake that enables torque control on the APS shaft by dissipating power into heat may be coupled to the APS's shaft as illustrated in TGS embodiment 230 (see, e.g., FIG. 2D). In some cases a TGS embodiment 240 may be provided where a brake can be incorporated into the planetary gear design (as e.g. illustrated in FIG. 2E).

In at least certain embodiments, power supply types for MPS and APS may be the following.

The MPS may be internal combustion engine(s) (ICE) such as: piston, wankel rotary engines, jet engine, gas turbine engine, rocket engine, hydraulic engine. In other example, the MPS may be an External Combustion Engine (ECE) such as Steam, Stirling.

The APS may be: electric motor (EM), AC brushless, AC brushed, DC brushless, DC brushed, Outrunner, Inrunner.

In certain embodiments, an electric motor may be used as the MPS or APS power inputs and it may be supplied with energy using any electrical energy storage device such as: a battery, a fuel cell, PV cells, an alternator or any combination of the above. In at least certain embodiments, a fully electrical VTOL may have its electric motor functioning as the VTOL's MPS configured to be of higher power capacity and/or more efficiency than the electric motor functioning as the VTOL's APS.

The APS can be used to accelerate or decelerate the output shaft that is driven by the MPS—depending on the direction of revolution of the APS. For example, a TGS translating rotational movements of incoming APS('s) and MPS to provide outgoing rotational movements in the same rotational directions will result in an increase in the overall outputted RPM. And a TGS translating rotational movements of incoming APS('s) and MPS to provide outgoing rotational movements in the opposing rotational directions will result in a decrease in the overall outputted RPM.

In certain embodiments, an electric motor (EM) functioning as the APS can also be used to start e.g. an internal combustion engine (ICE) of the MPS if used. A brake and/or a clutch can be incorporated into the MPS drive shaft in order to achieve different effects such as: Brake/one-way clutch: so it can be stopped when a propulsion system using same is receiving power from the APS alone. A clutch may be beneficial in disconnection of the MPS from driving the TGS gears while idling.

Possible options of incorporating a brake/one-way clutch may include the following.

Incorporation on the rotor shaft. This may be used at least in some cases in order to start the ICE MPS using the EM APS. The APS if turned in opposite direction may, in turn, try to spin the rotor in the wrong direction. A one-way clutch incorporated on the rotor shaft will stop the rotor shaft and consequently divert all the energy back up the MPS shaft (and in the correct direction) spin it and make it start.

Incorporation on the MPS shaft. This may prevent the MPS shaft from spinning in the opposite direction. This can happen in the case of an ICE failure/shutdown when the vehicle is powered only by the APSs.

Incorporation on the APS shaft. This may be beneficial in the case of an APS failure. The rotor may still spin on the MPS power, but this may urge spinning of the APS shaft in the wrong direction. A one-way clutch may prevent that and allow emergency operation of a rotor when its APS has failed.

And finally, a clutch on the MPS shaft may be beneficial while idling.

In certain embodiments, a one-way clutch can be incorporated into an APS drive shaft in order to allow the driving of the propeller in the event of an APS failure.

Figure 3:
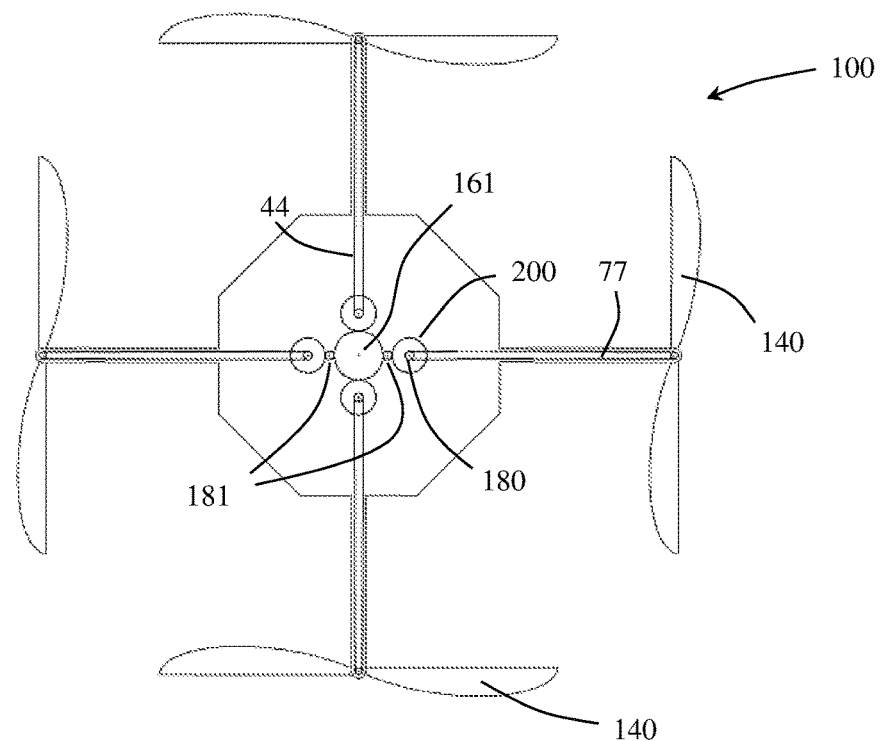
FIGS. 3 and 4 schematically show various VTOL embodiments of the present invention.
Figure 4:
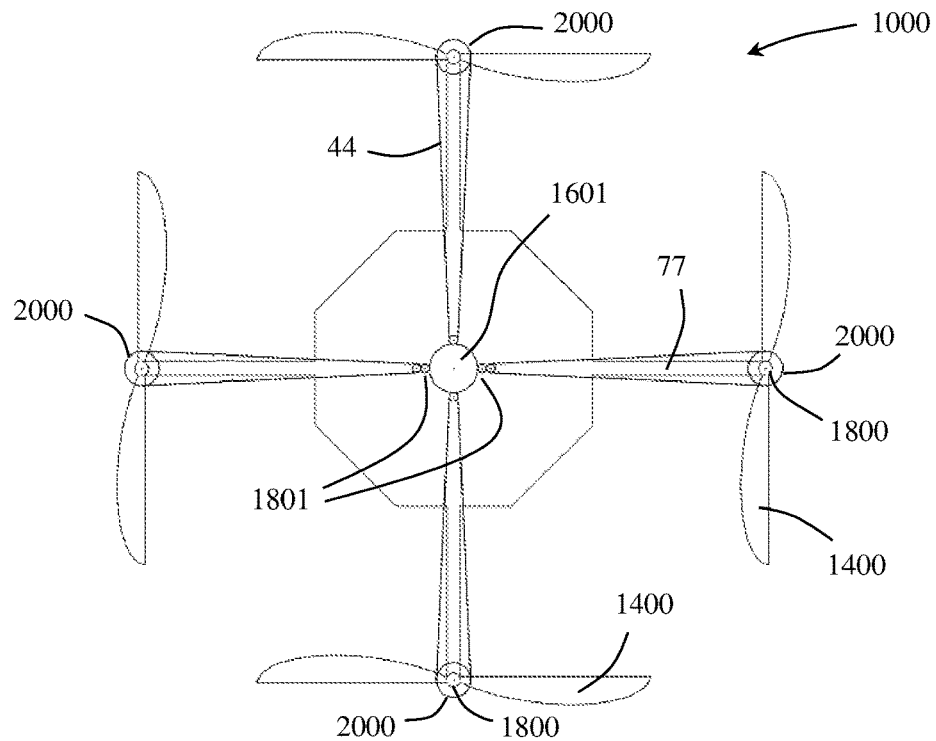

Attention is drawn to FIGS. 3 and 4 illustrating various vertical take-off and landing (VTOL) aerial vehicle embodiments.

FIG. 3 illustrates a VTOL embodiment 100 where power from a main power supply (MPS) (the MPS is located beneath the VTOL in this view and thus concealed); may be centrally divided by a distribution means such as a distribution gear 161 to TGS's 200, which in turn are each connected/coupled via respective driving means 44, here in form of possible belts, to a prop/rotor 140 located along an arm 77 of the VTOL. An APS 180 may also be coupled to each such TGS 200. VTOL 100 includes in this example two reversing gears 181 configured to reverse rotation arriving from the MPS towards their respective TGS's and rotors, so that overall compensation of torques is provided.

FIG. 4 illustrates a VTOL embodiment 1000 where power from a main power supply (MPS) (the MPS is located beneath the VTOL in this view and thus concealed); may be divided by a distribution means such as a distribution gear 1601 and then distributed outwards via driving means 44, here in form of possible belts, to TGS's 2000, which in turn are directly connected/coupled to each respectable prop/rotor 1400 located at an end region of an arm 77 of the VTOL. An APS 1800 may also be coupled to each such TGS 2000. VTOL 1000 includes in this example two reversing gears 1801 configured to reverse rotation arriving from the MPS towards their respective TGS's and rotors, so that overall compensation of torques is provided. In various example, the above mentioned 'distribution means' may take various forms, such as an arrangement where two TGS's may be configured to receive power directly from the MPS via a first shaft (not shown) and the other two TGS's may receive their power from the MPS via a second shaft (not shown) that is in communication with the first shaft and is configured to rotate in a counter direction of rotation.

Attention is drawn to FIG. 5A to 5E illustrating various manners of operation of a VTOL incorporating any one of the above described members, such as: MPS, APS and TGS components. These figures illustrate power from an MPS being possibly distributed by a distribution means such as a 'distribution gear' into separate outgoing powers 51, 52, 53, 54 each being communicated onwards to a respective TGS 71, 72, 73, 74. The TGS's may be located an end regions arms of the VTOL (as e.g. in FIG. 4) or centrally located (as e.g. in FIG. 3). As also indicated in FIG. 5, power from the MPS may possibly also be channeled via an alternator, which in turn may be used, inter alia, for charging a buffer battery that provides power to drive the EM APSs. With attention additionally drawn to the section at the bottom right hand side of FIG. 5A, it is seen that in certain embodiments, electric power supplied to the alternator (e.g. from the buffer battery) may urge the alternator to function as an EM for starting up e.g. the VTOL's MPS (when the MPS is an ICE).

Possible electric speed controllers receiving inputs, here exemplified by sensor data fed into a flight controller, may be configured to control each a respective APS to produce an outgoing RPM 61, 62, 63, 64 that may be respectively received at one of the TGS's 71, 72, 73, 74. Each TGS 71, 72, 73, 74 that receives an incoming RPM from one of the MPS's distributed RPMs 51, 52, 53, 54 and one of the of the APS's RPMs 61, 62, 63, 64; may be configured to produce an outgoing transformed RPM 81, 82, 83, 84 possibly powering rotation of one of the rotors of the VTOL possibly located at an end region of an arm of the VTOL.

Figure 5A:
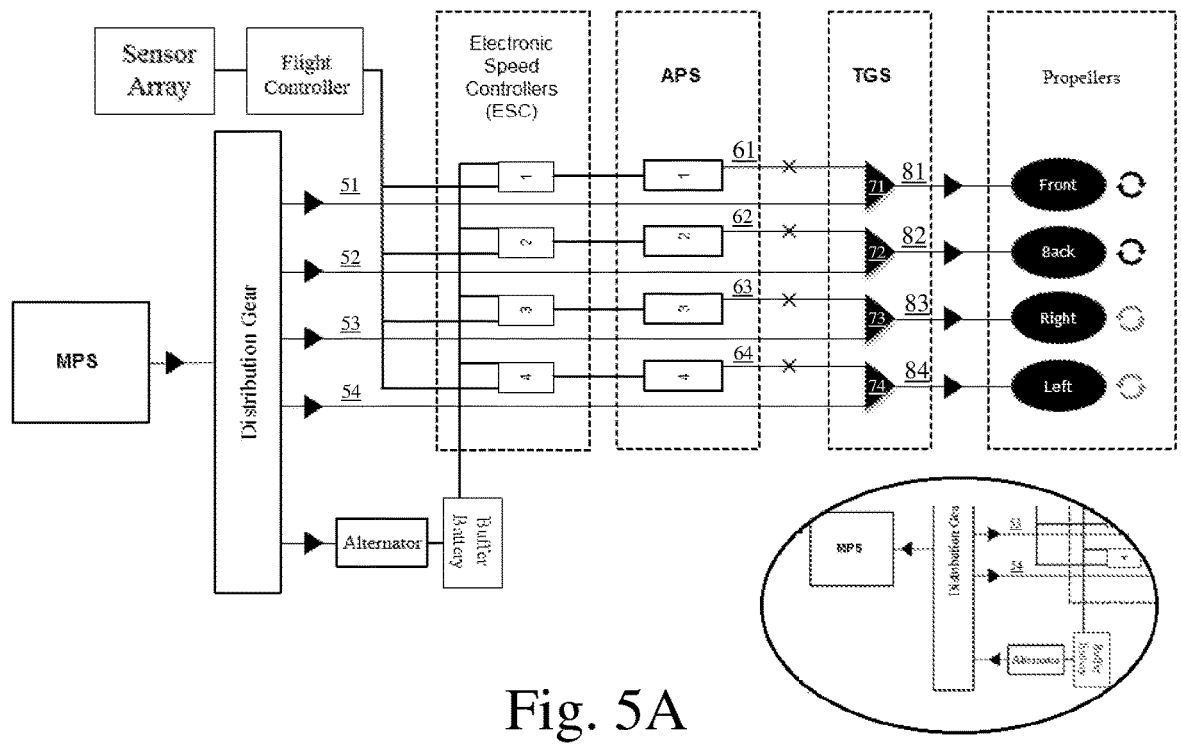
FIGS. 5A to 5E schematically show various schemes of operating a VTOL according to at least certain embodiments of the invention.

FIG. 5A represents a mode of operation possibly representative of a so-called 'stable hover' of a VTOL, where all TGS's receive power substantially only from the MPS while substantially no incoming power arriving from the APS's which in some cases may be shut off. Consequently, in this possible mode of operation, the outgoing power from each TGS to its respective rotor substantially originates from the VTOL's MPS.

Possibly, in at least certain VTOL embodiments, the APS's may be configured to substantially provide at least some outgoing power, e.g. a minimal amount of outgoing power, and consequently not be entirely idle or shutoff. Thus, by altering the outgoing power from the APS's in such cases (either by lowering or increasing their outgoing power), improved control of such VTOL embodiments may be obtained. For example, better control of maneuverability of the VTOL may be obtained, by such outputted changes in each APS being fed into its respective TGS—in order to affect the RPM outputted from the TGS towards the VTOL's rotors. Thus, the "x's" marked, (e.g., on the line exiting each APS in FIG. 5A) may not necessarily indicate the APS's being shutoff but rather functioning at a low and equal capacity.

Figure 5B:
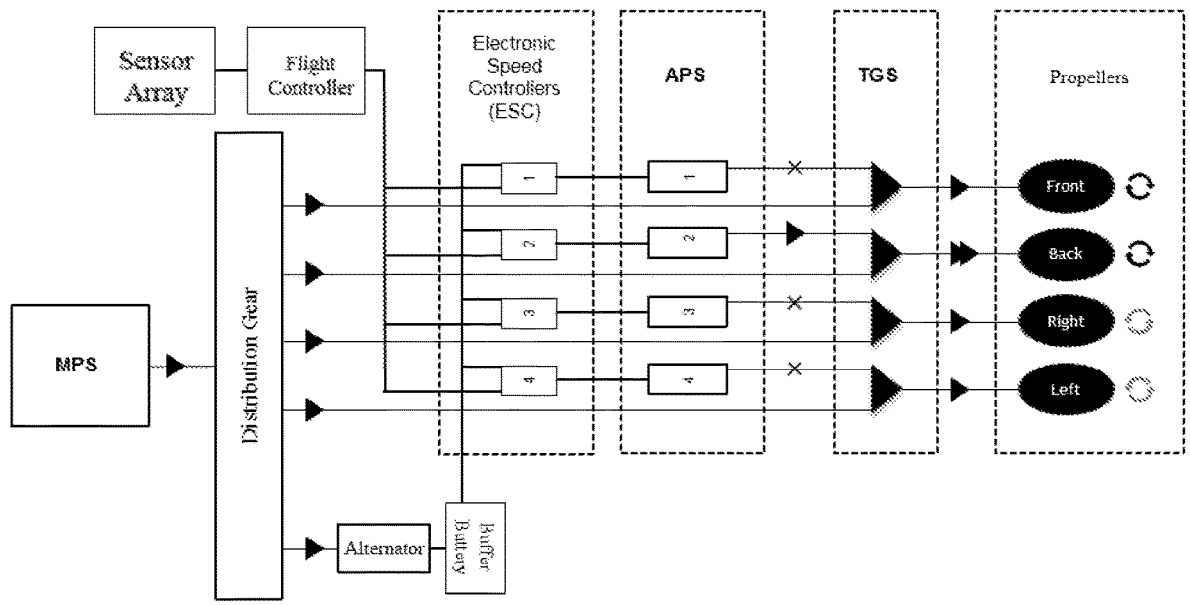

FIG. 5B represents a mode of operation possibly representative of a so-called 'dive' of a VTOL. Starting from the state illustrated in FIG. 5A here one of the APS's contributing power to the rotor at the back of the VTOL kicks into substantial operation in a rotational direction contributing to the RPM of the MPS; hence urging the back of the VTOL to rise and the VTOL to 'dive'.

Figure 5C:
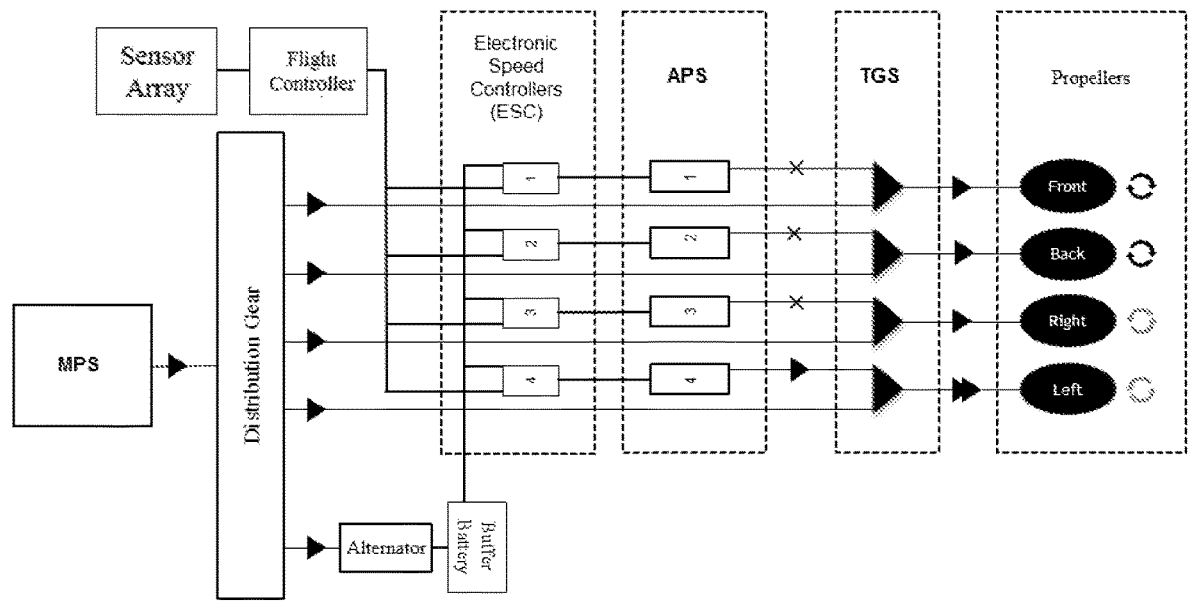

FIG. 5C represents a mode of operation possibly representative of a so-called 'roll right' of a VTOL. Starting here from the state illustrated in FIG. 5A an APS contributing power to the left-hand rotor of the VTOL kicks into substantial operation in a rotational direction contributing to the RPM of the MPS; hence urging the left-hand side of the VTOL to rise and the VTOL to perform a "roll right" maneuver.

Figure 5D:
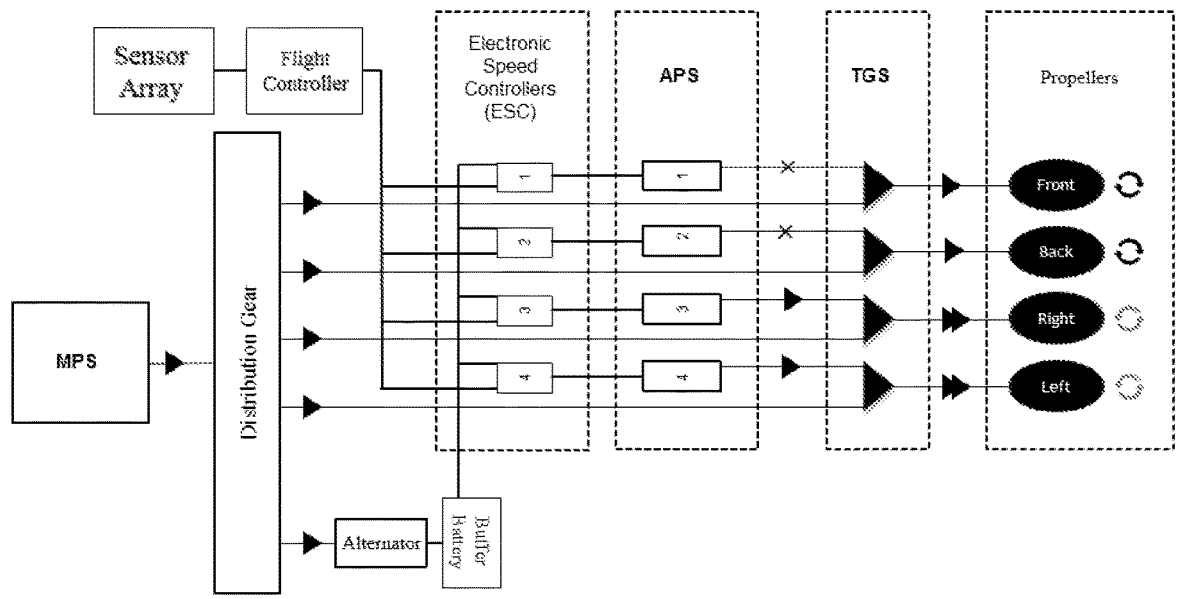

FIG. 5D represents a mode of operation possibly representative of a so-called 'yaw right' of a VTOL. Starting here e.g. from the state illustrated in FIG. 5A two APS's of right and left kick into action substantially simultaneously causing an imbalance of the reaction torques and therefore causing the vehicle to yaw right. (while possibly the other two APS's or the MPS RPM may need to be lowered in order to prevent the VTOL from climbing so that substantially only yaw maneuver is made).

Figure 5E:
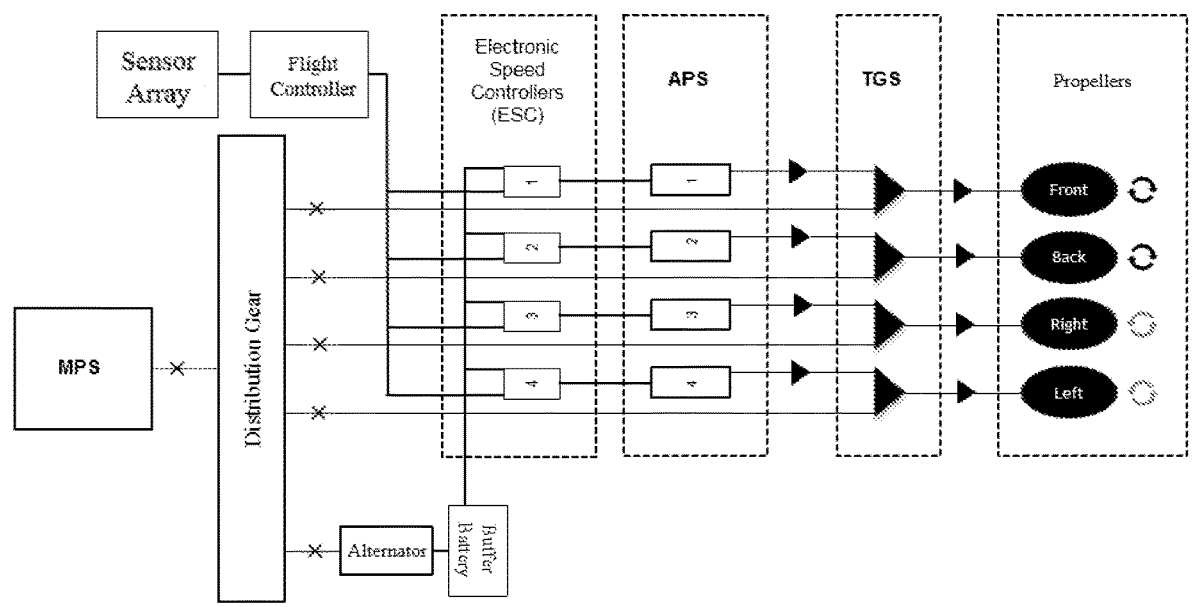

FIG. 5E represents a mode of operation possibly representative of a so-called 'main engine failure' of a VTOL, where power ceases to be provided from the MPS. In this example, all APS's are illustrated kicking into substantial operation in order to power the VTOL and stabilize its flight. In some embodiments—this may represent an emergency situation and the power from the APS powered by the buffer battery may be used only to bring the vehicle to a safe emergency landing. In other embodiments, this may represent a planned feature—where the MPS is deliberately shut off in order to provide quite operation in some periods of the flight.

Figure 6A:
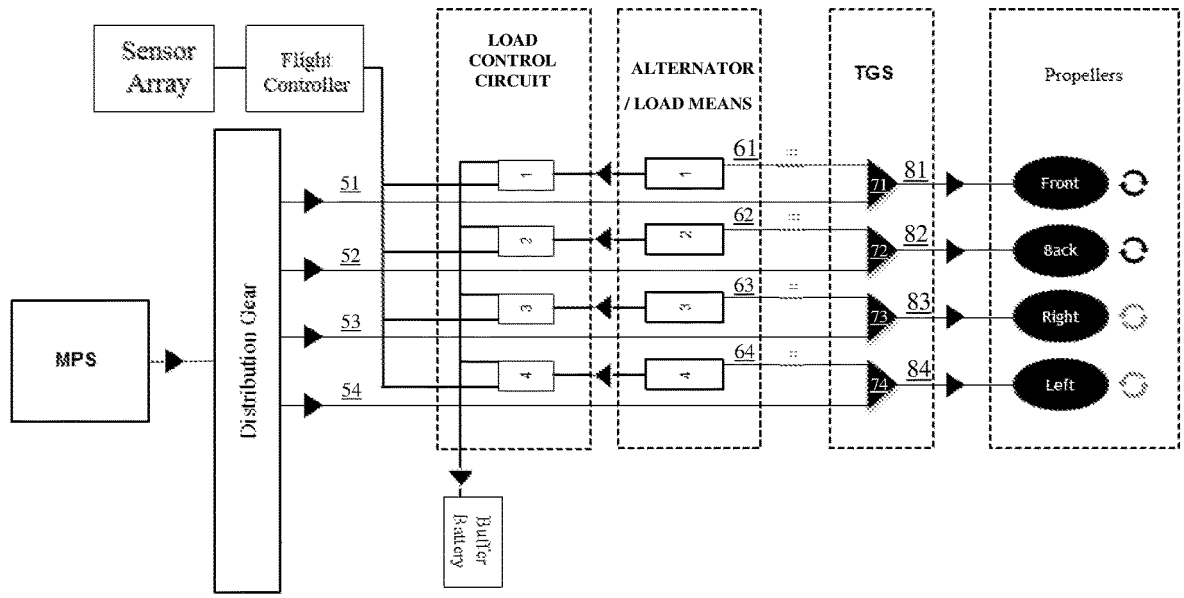
FIGS. 6A to 6C schematically show various operational modes of operation of some VTOL embodiments.
Figure 6B:
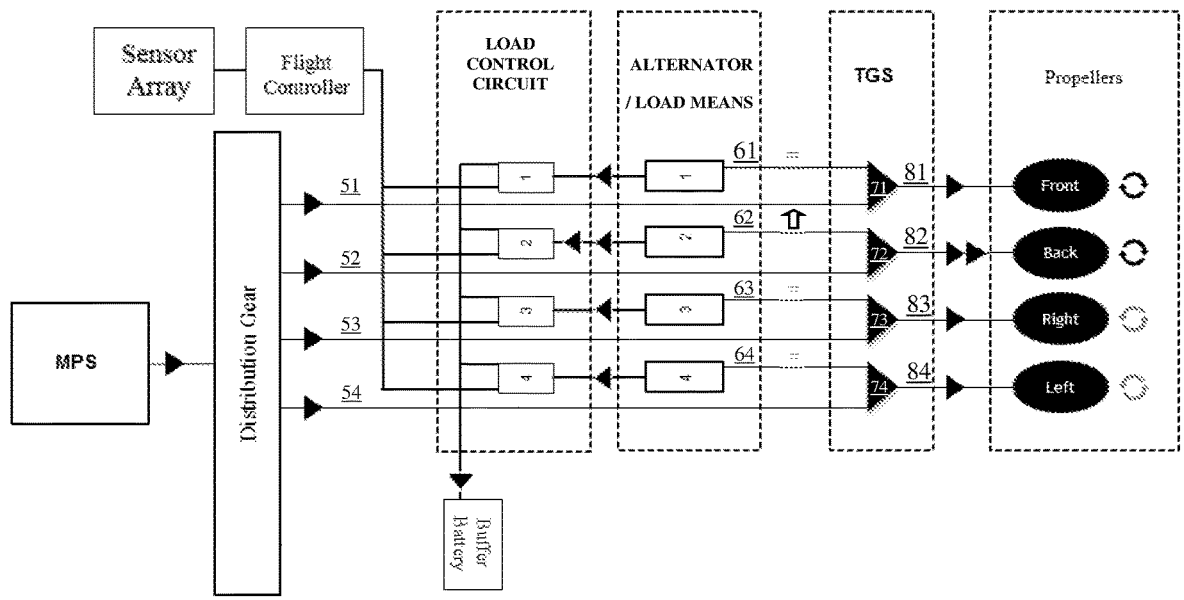
Figure 6C:
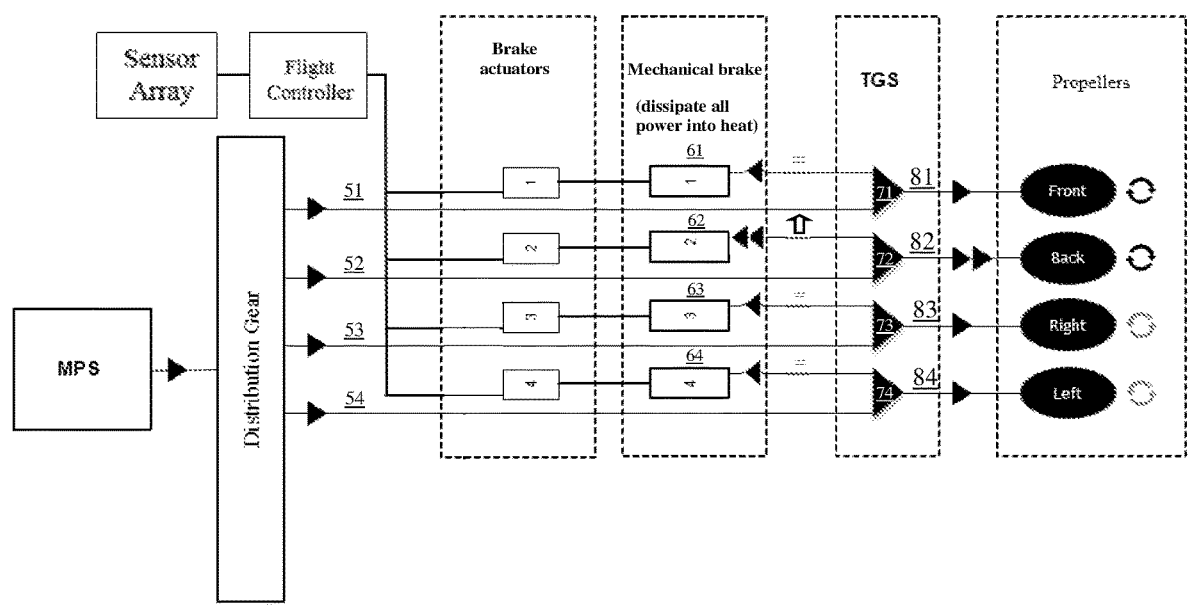

Attention is drawn to FIGS. 6A to 6C illustrating an aspect of at least certain VTOL embodiments of the invention, where control of the amount of power delivered to a given rotor may be controlled by the amount of torque applied on a shaft of (and/or in communication with) a TGS coupled to the rotor by a load means (LM) possibly being in the form of an alternator and/or clutch/break. Such torque control may be due to e.g. an APS being used as an alternator applying mechanical load onto a 'load-shaft' of the APS coupled to the TGS and/or by a break or clutch being used (possibly instead or in addition to an APS) to apply mechanical load onto such 'load-shaft' coupled to the TGS. FIG. 6C illustrates an example of a break being used for applying mechanical load on load-shafts' of TGS's, while here an upward arrow may possibly mean a higher torque applied, and a double arrow to the right of the brakes blocks may possibly mean a different flow of power than the other brakes—may be higher and/or lower.

In principle, the larger the torque being applied onto such 'load-shaft', the higher the outputted torque that the TGS transmits to its rotor. In VTOL embodiments utilizing e.g. a planetary type TGS, such as TGS 200 illustrated in FIG. 2A, shaft 30 may be referred to as such 'load shaft' and by increasing torque upon shaft 30 the outgoing torque transmitted from the TGS to its rotor may be increased.

In embodiments where an APS is utilized to apply a controlled load that acts to reduce rotation upon the 'load-shaft' connected to the TGS, the APS essentially functions as an alternator, which on the one hand functions as a brake increasing torque and thus reducing RPM of the 'load shaft' while also harvesting electrical energy that may be transmitted via a load 'control circuit' to be stored in a battery of the VTOL for later use. Such load 'control circuit' may be configured to alter the load applied by an alternator onto its TGS by a signal/command arriving from a flight controller or the like; and the harvested energy may be immediately utilized for operation of the VTOL and/or may accordingly be stored for later use. In case of a VTOL including a load means such as a clutch or brake, the load 'control circuit' may be configured to alter the load applied by such clutch or brake onto the TGS by e.g. a signal/command arriving from a flight controller.

In embodiments where load on the 'load shaft' is applied by means such as a brake or clutch, the energy absorbed by increasing the torque on the 'load shaft', which consequently increases the torque and RPM applied to the rotor, may be e.g. dissipated into heat.

In FIG. 6A, the 'equal' (i.e. "=") sign marked on the line existing each APS and/or load-means indicates a substantially identical "load" that is applied on all load-shafts entering the TGS's and consequently all TGS's are configured to convey torque and RPM to their respective rotors in a substantially similar manner.

In FIG. 6B, the 'upward directed arrow' marked on the line exiting APS and/or load means 62 indicates a higher relative torque that is applied upon the load-shaft entering TGS 72 and consequently the torque and RPM exiting this TGS towards its associated rotor will be higher in relation to the other rotors.

If this rotor (as marked) is the rear rotor, then this may represent a dive maneuver of a VTOL With reference to the above discussed examples in FIG. 6, it is noted that in a VTOL embodiment including an APS that may periodically function as an alternator, switching from an alternator mode where power is extracted from its respective TGS to an APS mode where the APS contributes power to its respective TGS—may be defined by a controller of the VTOL and/or may be pre-defined. For example, when a maneuver requiring power from the APS's is required, the APS's may kick into operation to provide extra power to its respective rotor (e.g. instead of functioning as alternators). In another example, when the battery storing harvested energy is full, the alternator mode may cease and the APS's may be urged to kick into operation. Similarly, the transition from an APS mode to alternator mode may be equally be controlled.

Figure 7:
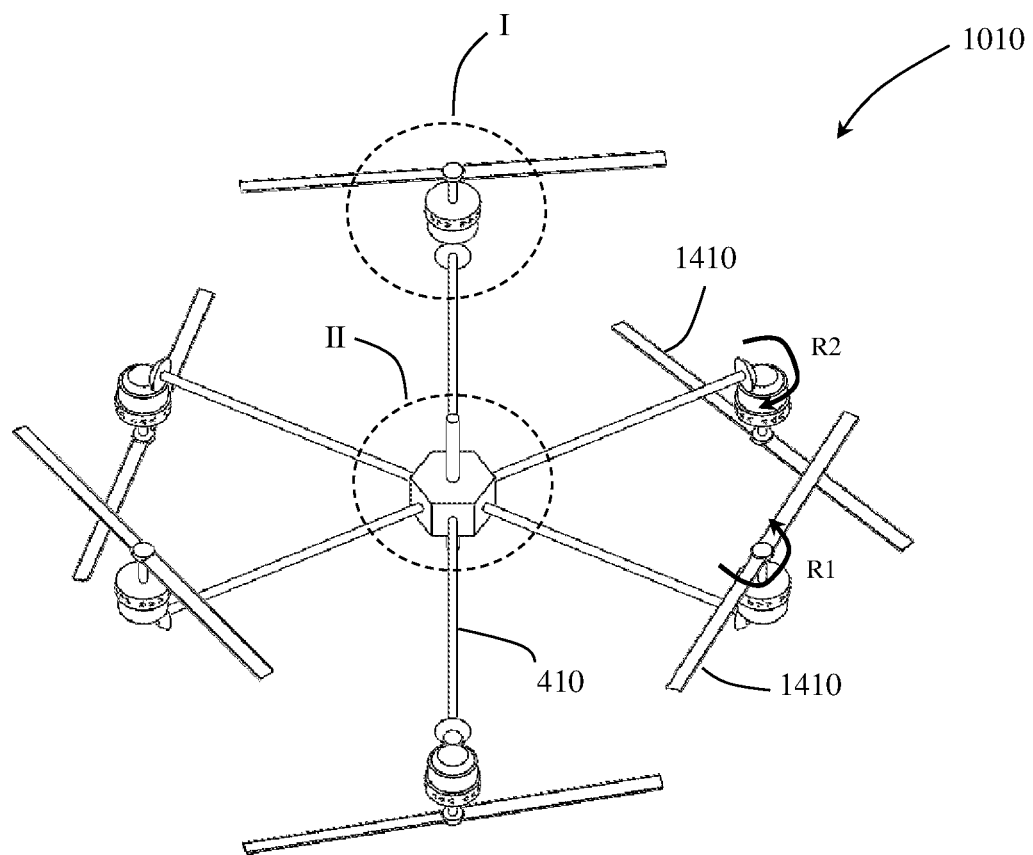
FIGS. 7 and 8 schematically show vertical take-off and landing aircrafts (VTOL) in accordance with various embodiments of the present invention.
Figure 7:
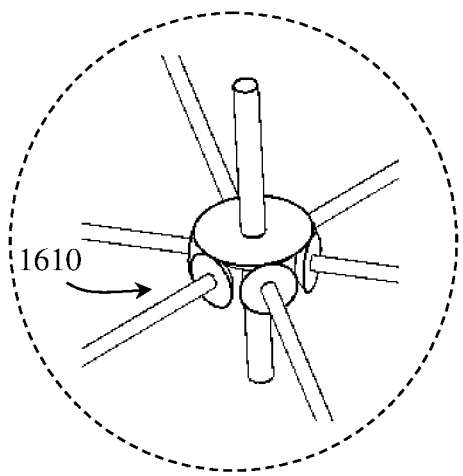
Figure 7:
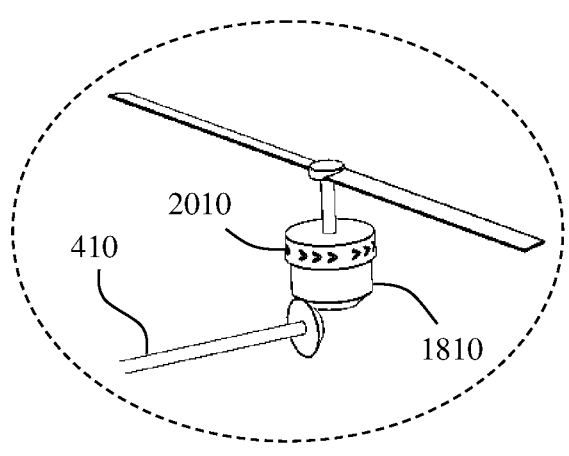

Attention is drawn to FIG. 7 schematically illustrating an embodiment of a vertical take-off and landing aerial vehicle (VTOL) 1010. VTOL 1010 is of a generally hexa-rotor type including six rotors 1410 each at a respective end region of an arm of the VTOL. Adjacent rotors in this example in VTOL 1010 are arranged to rotate in counter directions (see marked R1, R2) to form counter forces of torque that substantially balance each other to provide a more controllable handling of the VTOL and operational redundancy. It is noted that in this view outer housing members of the VTOL have been removed to expose interior mechanisms and members that will now be discussed.

In VTOL 1010 power from a main power supply (MPS) (MPS is not seen is this view) may be divided by a distribution means such as a distribution gearset 1610 best seen in enlarged section II at the lower left side of the figure. The distributed power may then be distributed outwards in this example via rotating shafts 410 (running along arms of the VTOL) to TGS's 2010, which in turn are directly connected/coupled to each respectable prop/rotor 1410. The TGS's can be best seen in enlarged section I at the lower right-hand side of the figure. An auxiliary power source (APS) 1810 may also be coupled to each such TGS 2010—so that each TGS may be adapted to form an outgoing power towards its respective rotor from input powers received into the TGS from the MPS and from the APS associated therewith. In this view—although not fully visible—coupling between an end region of shaft 410 and the TGS is done through a gearset and shaft like member that runs through the APS.

Figure 8:
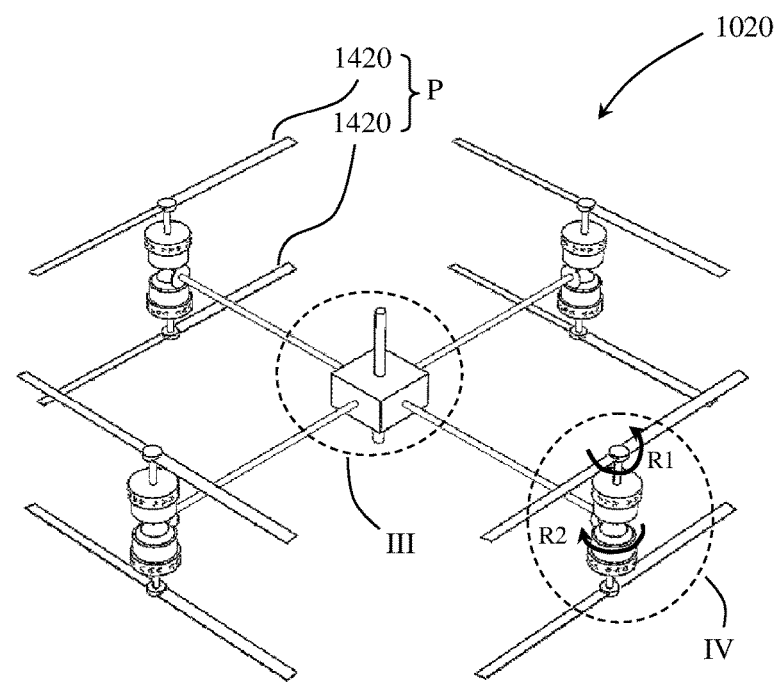
Figure 8:
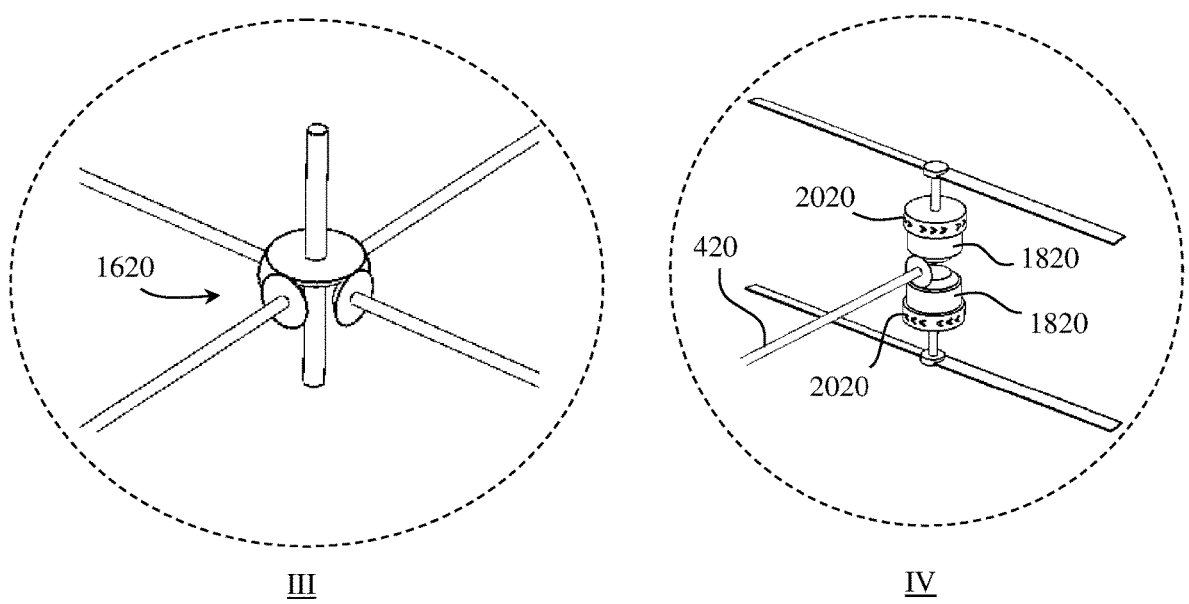

Attention is drawn to FIG. 8 schematically illustrating an embodiment of a vertical take-off and landing aerial vehicle (VTOL) 1020. VTOL 1020 is of a generally octa-quad type including eight rotors 1420—here grouped into pairs P located, here co-axially, one above the other. Each such pair P in this example is located at an end region of a respective arm of the VTOL. Adjacent rotors in each pair P of VTOL 1020 are arranged to rotate in counter directions (see marked R1, R2) to form counter forces of torque that substantially balance each other to provide a more controllable handling of the VTOL and operational redundancy. It is noted that in this view outer housing members of the VTOL have been removed to expose interior mechanisms and members that will now be discussed.

In VTOL 1020 power from a main power supply (MPS) (MPS is not seen is this view) may be divided by a distribution means such as a distribution gearset 1620 best seen in enlarged section III at the lower left side of the figure. The distributed power may then be distributed outwards in this example via rotating shafts 420 to TGS's 2020 extending each along an arm of the VTOL. Each shaft 420 may be connected/coupled to a respective prop/rotor 1420 at an end region of an arm of the VTOL. The TGS's can be best seen in enlarged section IV at the lower right side of the figure. An auxiliary power source (APS) 1820 may also be coupled to each such TGS 2020—so that each TGS may be adapted to form an outgoing power towards its respective rotor from input powers received into the TGS from the MPS and from the APS associated therewith.

Figure 9A:
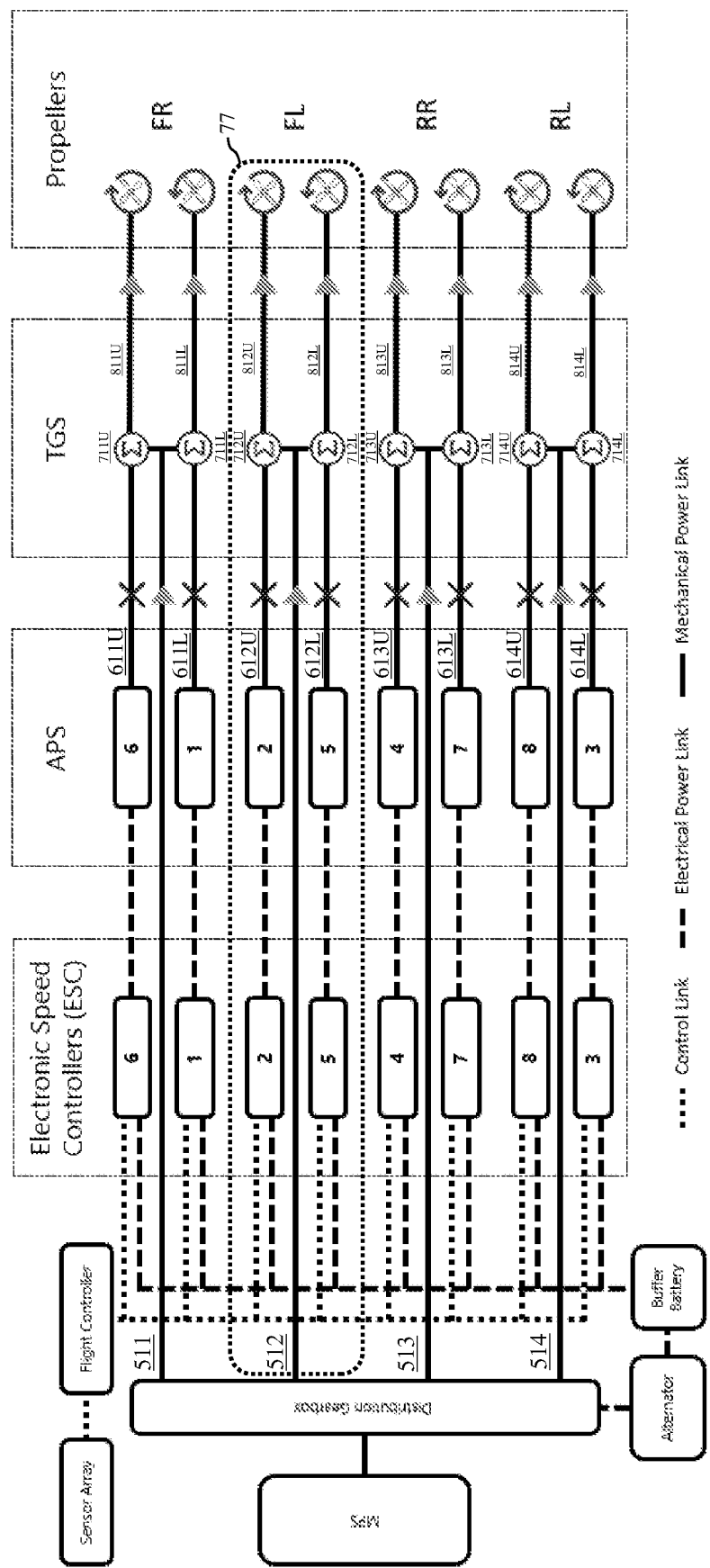

Attention is now drawn to FIGS. 9A to 9E illustrating various manners of operation of a VTOL generally similar e.g. to 1020—and incorporating any one of the above described members, such as: MPS, APS and TGS components. FIG. 9A may be better representative of VTOL 1020—while manners of operation of VTOL 1010 may be better described e.g. with respect to the illustrations of FIGS. 5—(considering there six rotors instead of the four shown and discussed).

FIG. 9A illustrates power from an MPS being possibly distributed by a distribution means such as a 'distribution gear' into "separate" first 511, second 512, third 513 and fourth 514 MPS powers. Each such "separate" MPS power may be associated with a respective arm of the VTOL—and each such "separate" MPS power may be arranged to be communicated onwards to a respective first, second, third or fourth pair of associated TGS's. Each TGS pair in turn includes an upper TGS 'U' and a lower TGS 'L'. That is to say that the first TGS pair includes an upper TGS 711U and a lower TGS 711L; the second TGS pair includes an upper TGS 712U and a lower TGS 712L (and so on). In the example of VTOL 1020—each TGS pair is located an end region of an arm of the VTOL.

A flight controller may be configured to control via a possible electric speed controller—pairs of APS's that produce each a respective independent upper 'U' and lower 'L' outgoing RPM. For example: the first pair of APS's produces by one of its APS's an outgoing upper RPM 611U and by the other APS an outgoing lower RPM 611L; the second pair of APS's produces by one of its APS's an outgoing upper RPM 612U and by the other APS an outgoing lower RPM 612L (and so on).

Each respective TGS may thus be configured to form an outgoing power towards its respective rotor from input powers received from the MPS and from the APS associated therewith. In other words, each upper 711U and lower 711L TGS in the first TGS pair is configured to, respectively, form an upper 811U and lower 811L outgoing power—from input powers arriving from the first MPS power 511 and from, respectively, the upper RPM 611U and the lower RPM 611L of the first APS pair. Similarly, each upper 712U and lower 712L TGS in the second TGS pair is configured to, respectively, form an upper 812U and lower 812L outgoing power—from input powers arriving from the second MPS power 512 and from, respectively, the upper RPM 612U and the lower RPM 612L of the second APS pair; (and so on).

With reference to VTOL 1020—the schematics provided in FIG. 9A may be defined as including for each respective arm 77 (see 'dotted' rectangle in FIG. 9A marked 77), inter alia, one "separated" outgoing MPS power, two TGS's and two APS's.

As a general remark applicable to at least most VTOL embodiments discussed herein—it is noted that—since at least some multirotor VTOL's may be considered as inherently unstable systems—provision of APS's may be useful for increasing overall VTOL stability—by e.g. kicking into operation to increase/decrease outgoing RPM to rotors of the VTOL for RPM compensations useful for increased stability.

An additional general remark applicable to VTOL's of the present embodiments, such as VTOL 1020 here discussed—relates to provision of power arriving from both the MPS and APS's—that provides redundancy that enables such VTOL's to keep operating also if some or part of their power sources at least partially malfunction.

FIG. 9A for example illustrates an option where the APS's do not contribute outgoing powers to the TGS's and only the MPS provides power. Thus, in this example, rotors of the VTOL are powered only by the MPS.

Figure 9B:
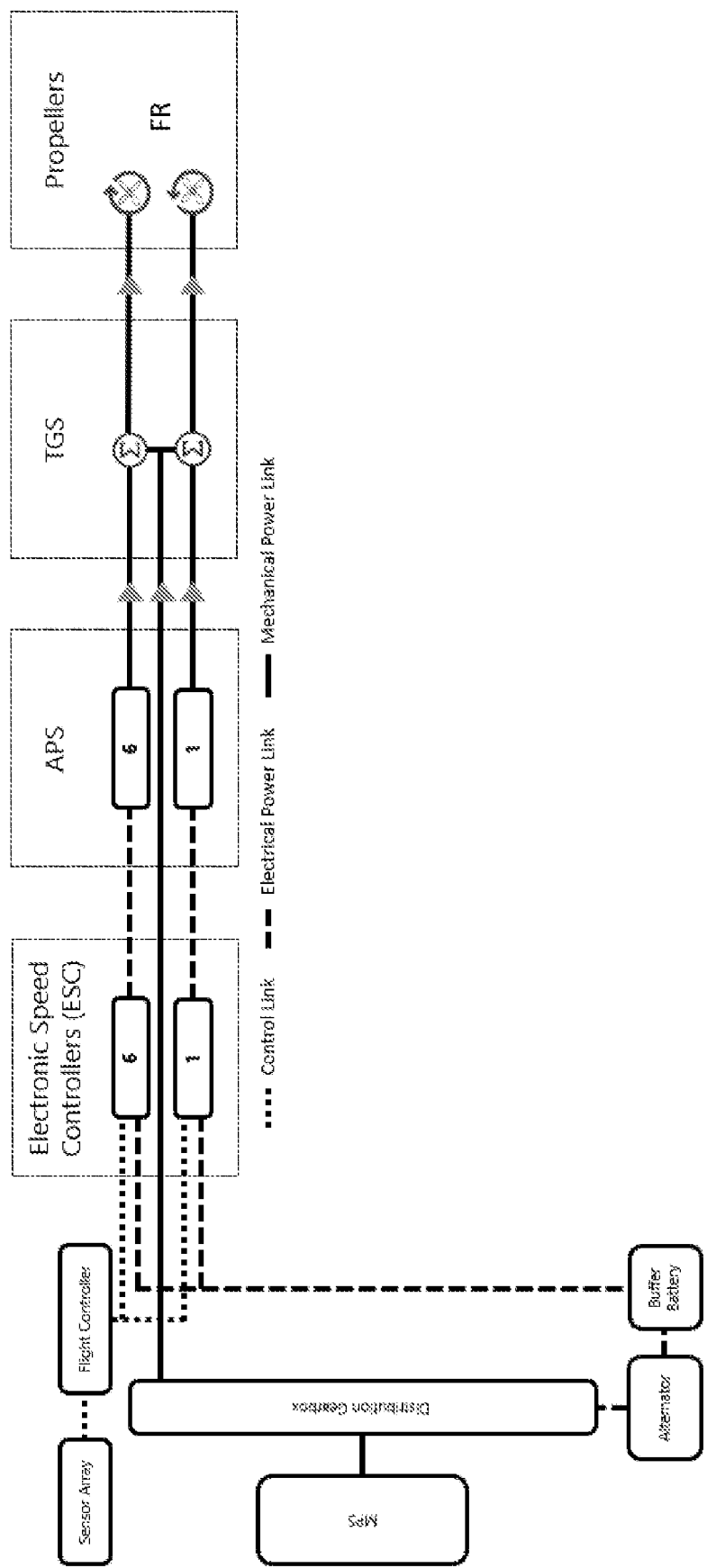

Attention is now drawn to FIGS. 9B to 9E—to exemplify such redundancy—by observing elements associated with one arm 77 of the VTOL—here including one pair of rotors such as in VTOL 1020. FIG. 9B exemplifies a scenario where all power sources function and thus each rotor in the shown pair is powered by a combination of power arriving from both the MPS and from each APS associated with the rotor.

Figure 9C:
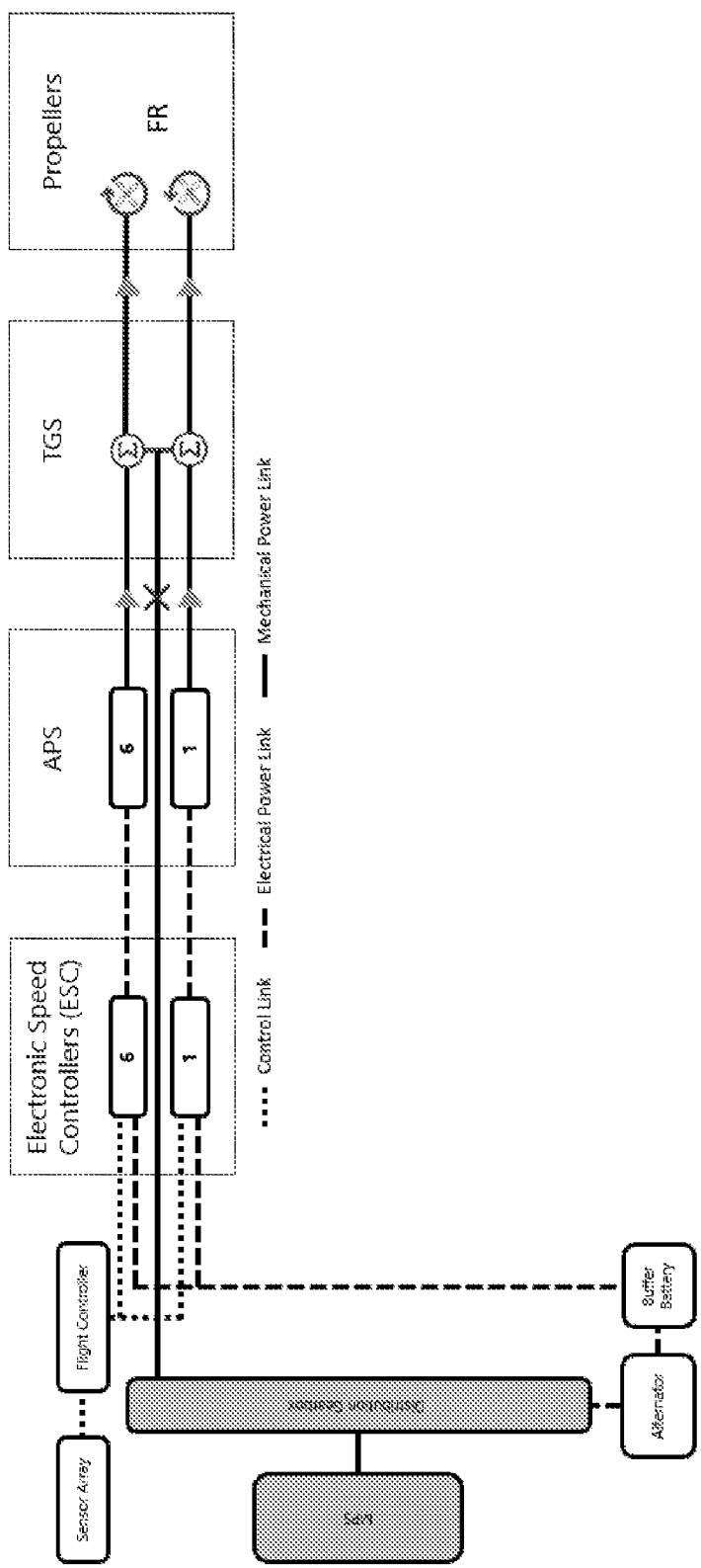

FIG. 9C exemplifies a scenario where the MPS (marked here in gray) fails to provide outgoing power and/or the distribution gearbox fails thus affecting failure in transfer of power to all TGS's. Alternatively, FIG. 9C may define a scenario where failure may take place in a power transfer apparatus between the MPS and TGS's of a certain arm—thus affecting only one TGS pair. In any case—in the scenario of FIG. 9C all the APS's are shown functioning and thus providing outgoing power—thus resulting in each rotor in this pair being powered only by the APS associated therewith. It is understood that this above discussed failure may occur also in more than one arm—thus hypothetically permitting production of lift by APS's only in all arms.

Figure 9D:
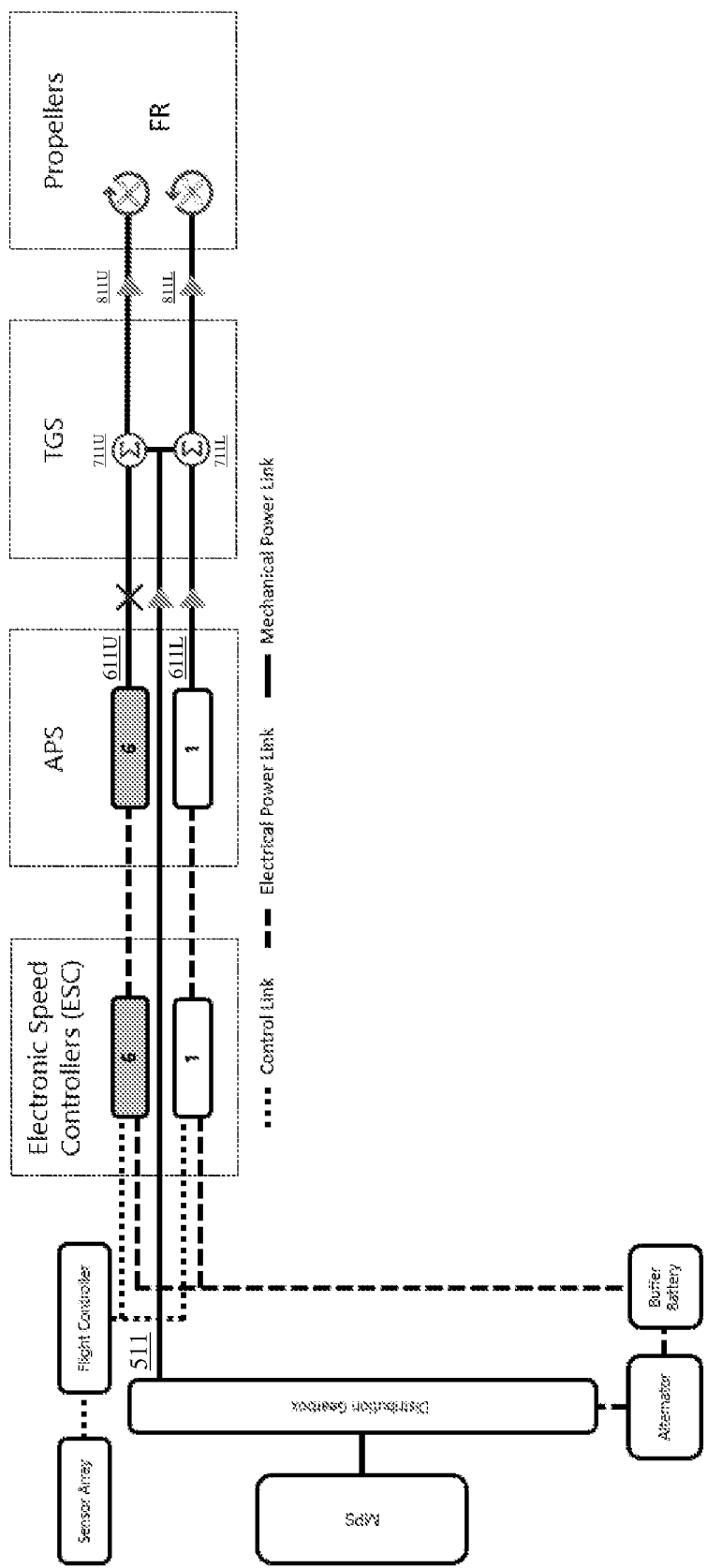

FIG. 9D exemplifies a scenario where power arrives from the MPS however one of the APS's (here that associated to the upper rotor) fails to provide outgoing power, while the other APS (here that associated to the lower rotor) does provide outgoing power. Thus, in this case the upper rotor will be powered by the MPS while the lower rotor by both the MPS and the APS associated with the lower rotor. This allows the upper rotor to continue providing constant power output based on the MPS only, while the other props compensate to allow control of the vehicle.

Figure 9E:
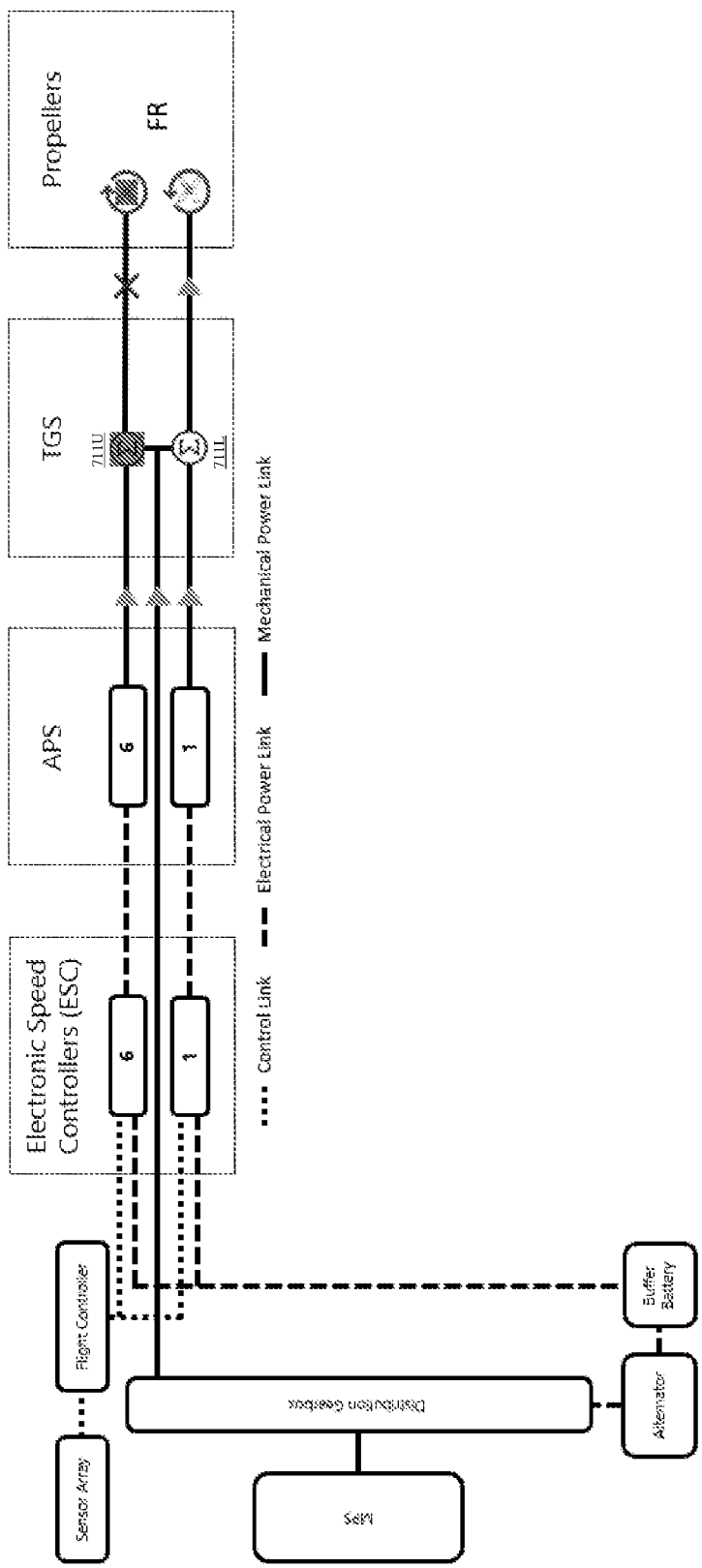

FIG. 9E exemplifies a scenario where the TGS associated with the upper rotor and/or the rotor itself malfunction, resulting in the upper rotor of this pair not receiving any power—while the lower rotor in this example does receive power in this example from both the MPS and the APS associated with the lower rotor. This redundancy is here exemplified by the VTOL still being able to operate—here by receiving lift power from only one rotor of the rotor pair.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Further more, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures can not be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

The invention claimed is:

1. A vertical take-off and landing aerial vehicle (VTOL) comprising a plurality of rotors for producing lift,
   for each respective rotor the VTOL comprising an auxiliary power source (APS) and a transformation gear set (TGS) both being associated with the respective rotor, and the VTOL further comprising at least one main power source (MPS),
   each TGS being configured to form an outgoing power towards its respective rotor from input powers received into the TGS from the MPS and from the APS associated with the respective rotor.

2. The VTOL of claim 1, wherein the number of rotors and consequently APS's and TGS's is at least three.

3. The VTOL of claim 2, and comprising a distribution means for dividing incoming power arriving from the MPS into outputted power communicated to each TGS.

4. The VTOL of claim 1, wherein the TGS is a gearbox, possibly a transformation gearbox, that is configured to receive power input from a few sources, preferably simultaneously, and output them into a single combined power output.

5. The VTOL of claim 4, wherein the output RPM of a TGS is a linear or non-linear combination of the input RPM's arriving from a MPS and APS; and/or wherein maneuverability of the VTOL being controlled by varying the RPM and/or Torque and/or Power arriving from the APS up or down.

6. The VTOL of claim 4, wherein TGS is any one of a planetary type gearbox or a differential type gearbox.

7. The VTOL of claim 1, wherein the number of TGS's and APS's is the same as the number of rotors in the VTOL.

8. The VTOL of claim 1, wherein each TGS is directly connected/coupled to its respective rotor, preferably by being located adjacent the rotor.

9. The VTOL of claim 8, wherein each APS is directly connected/coupled to its respective TGS, preferably by being located adjacent its respective TGS.

10. The VTOL of claim 1, wherein the MPS is an internal combustion engine (ICE).

11. The VTOL of claim 1, wherein the MPS comprises a plurality of engines.

12. The VTOL of claim 11, wherein the rotors are divided into groups and each group is configured to receive power from a different one of the MPS engines.

13. The VTOL of claim 1, wherein each APS is an electric motor (EM).

14. A method for operating a vertical take-off and landing aerial vehicle (VTOL) comprising the steps of:
    providing a VTOL comprising a plurality of rotors for producing upward lift, for each respective rotor the VTOL comprising an auxiliary power source (APS) and a transformation gear set (TGS) both being associated with the respective rotor, and the VTOL further comprising at least one main power source (MPS),
    communicating into each TGS power from an MPS and one of the APS's, and
    outputting from each TGS towards its associated rotor an output power resulting from the powers incoming into the TGS.

15. The method of claim 14, wherein a stable hover operating state of the VTOL comprises inputting into all TGS's power mainly from the MPS.

16. The method of claim 15, wherein in the stable hover operating state the APS's are not idle, preferably providing a minimal power input to the TGS's, possibly up to about 10% of the inputted power to the TGS's, and/or wherein possibly the RPM of the APS's at stable hover being chosen so the MPS works at it's close to peak efficiency.

17. The method of claim 15, wherein starting from the stable hover operating state, the VTOL is urged to a dive or roll operating state by urging one of the APS's to increase its outgoing RPM.

18. The method of claim 15, wherein the plurality of rotors are at least four, and starting from the stable hover operating state, the VTOL is urged to a yaw operating state by urging increase in RPM of two or more APS's associated with rotors spinning in an opposite direction to the desired yaw, and/or decreasing RPM of two or more APS's associated with rotors spinning in the direction to the desired yaw.

19. The method of claim 14, wherein the VTOL comprising at least three rotors, and wherein at least one of the rotors upon receipt of incoming power is configured to rotate in a first rotational direction and at least one other rotor upon receipt of incoming power is configured to rotate in a second rotational direction that is counter to the first direction.

20. The method of claim 19, wherein the at least three rotors are four rotors and wherein a first pair of the rotors upon receipt of incoming power are configured to rotate in a first rotational direction and a second pair of the rotors upon receipt of incoming power are configured to rotate in a second rotational direction that is counter to the first direction.

21. The method of claim 20, wherein pairs of rotors rotating in the same direction are angularly spaced apart one from the other about a central axis of the VTOL that extends in the upward direction by about 180 degrees, with each rotor being spaced apart from its adjacent rotor about the axis by about ninety degrees.

22. The method of claim 19, wherein the rotors are distributed about a central axis of the VTOL that extends in the upward direction, while being angularly spaced apart one from the other about the axis.

23. The method of claim 14, wherein the VTOL having a pre-defined maximal lift power and this maximal lift power only being provided when powers and/or RPM's from the at least one MPS and APS's are combined.

24. A vertical take-off and landing aerial vehicle (VTOL) comprising a plurality of rotors for producing lift,
    for each respective rotor the VTOL comprising a load means (LM) and a transformation gear set (TGS) both being associated with the respective rotor, and the VTOL further comprising at least one main power source (MPS), each TGS being configured to form an outgoing RPM towards its respective rotor that depends on the RPM received into the TGS from the MPS and on the torque applied onto a load shaft of the TGS by the load means (LM).

25. The VTOL of claim 24, wherein increase of torque applied by the LM onto the load-shaft is configured to increase the torque outputted by the TGS towards its respective rotor.

26. The VTOL of claim 24, wherein the LM is an alternator configured to apply load onto the load-shaft by harvesting electrical power from it.

27. The VTOL of claim 26, wherein increase in load applied onto the load-shaft is achieved by an increase in harvesting of energy, that possibly is stored in a battery of the VTOL.

28. The VTOL of claim 26, wherein the alternator is configured to be used as an auxiliary power source (APS) of the VTOL for inputting torque into its TGS.

29. The VTOL of claim 28, wherein the LM being configured to alternate back and forth between APS and alternator states, where possibly determination of transfer away or towards alternator state depends on available harvested energy in the VTOL and/or expected maneuvers of the VTOL.

30. The VTOL of claim 24, wherein the LM is a clutch or break.

* * * * *